US011112355B2

(12) United States Patent
Hu et al.

(10) Patent No.: US 11,112,355 B2
(45) Date of Patent: Sep. 7, 2021

(54) NARROWBAND, ACOUSTICALLY MEDIATED SPINTRONIC TERAHERTZ EMITTER

(71) Applicant: Wisconsin Alumni Research Foundation, Madison, WI (US)

(72) Inventors: Jiamian Hu, Middleton, WI (US); Shihao Zhuang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/727,308

(22) Filed: Dec. 26, 2019

(65) Prior Publication Data
US 2021/0199571 A1 Jul. 1, 2021

(51) Int. Cl.
*G01J 1/42* (2006.01)
*G01N 21/3586* (2014.01)

(52) U.S. Cl.
CPC ............. *G01N 21/3586* (2013.01); *G01N 2201/06113* (2013.01)

(58) Field of Classification Search
CPC ............ G01N 21/3586; G01N 2201/06113
See application file for complete search history.

(56) References Cited

U.S. PATENT DOCUMENTS 7,652,769 B2   1/2010  Zhao et al.
10,161,790 B2  12/2018  Ding et al.
2002/0067480 A1  6/2002  Takahashi
2012/0113417 A1*  5/2012  Linfield ................. C30B 25/02 356/300
2019/0227404 A1*  7/2019  Wu ........................ H02K 35/00

FOREIGN PATENT DOCUMENTS

CN        109411993 A  *  3/2019

OTHER PUBLICATIONS

Feng et al., "Photonic structure enhanced spintronic terahertz emitter," Date of Conference: Sep. 1-6, 2019, published in 2019 44th International Conference on Infrared, Millimeter, and Terahertz Wave, 2 pages. (Year: 2019).*
Gao et al., "Coherent control of femtosecond spin current investigated by polarization dependent terahertz emission spectroscopy in ferromagnetic heterostructures", 2018, IEEE, 2018 43rd International Conference on Infrared, Millimeter, and Terahertz Waves, 2 pages. (Year: 2018).*
Wu et al., "High-Performance THz emitters based on a ferromagnetic/nonmagnetic heterostructures," 2017, Advanced Materials, vol. 29, 7 pages. (Year: 2017).*
Sasaki et al., "Annealing effect on laser pulse-induced THz wave emission in Ta/CoFeB/MgO films," 2017, Applied Physics Letters, vol. 111, p. 102401-1 to 102401-5 (Year: 2017).*

(Continued)

*Primary Examiner* — Kiho Kim
(74) *Attorney, Agent, or Firm* — Bell & Manning, LLC

(57) ABSTRACT

Acoustically mediated spintronic THz emitters in which sound waves, rather than direct laser pulses, give rise to a spin current in a magnetic material via magnetoelastic coupling are provided. The THz emitters include a metal layer that acts as a light-to-acoustic transducer. Also provided are THz time-domain spectrometers (THz-TDSs) that incorporate the THz emitters.

16 Claims, 39 Drawing Sheets

(56) References Cited

OTHER PUBLICATIONS

Ogiso et al., "The effect of metal cluster formation on THz range spectroscopy," 2009, Surface & Coatings Technology, vol. 203, pp. 2390-2394. (Year: 2009).*

Kampfrath et al., "Terahertz spin current pulses controlled by magnetic heterostructures," 2013, Nature Nanotechnology, vol. 8, pp. 256-260. (Year: 2013).*

Uchida et al., "Acoustic spin pumping: Direct generation of spin currents from sound waves in $Pt/Y_3FesO_{12}$ hybrid structures," Journal of Applied Physics 111, 053903 (2012), 8 pages.

Weiler et al., "Spin pumping with coherent elastic waves," Phys. Rev. Lett. 108, 176601—Apr. 23, 2020, 8 pages.

Masayoshi Tonouchi, "Cutting-edge terahertz technology," Nature Photonics, vol. 1, Feb. 2007, pp. 97-105.

Henighan et al., "Generation mechanism of terahertz coherent acoustic phonons in Fe," Physical review B 93, 2016, pp. 220301-1 to 220301-5.

Gobaut et al., "FeGaMgO/Fe/GaAs(001) magnetic tunnel junction: Growth and magnetic properties," Journal of Magnetism and Magnetic Materials 383 (2015) pp. 56-59.

Ferguson, B. et al., Materials for terahertz science and technology. Nature Mater 1, 26-33 (2002). https://doi.org/10.1038/nmat708.

Ho, L., et al., Nature Photon 2, 541-543 (2008). https://doi.org/10.1038/nphoton.2008.174.

International Search Report and Written Opinion for PCT/US2020/066537, dated Apr. 1, 2021.

Garik Torosyan et al., "Optimized Spintronic Terahertz Emitters Based on Epitaxial Grown Fe/Pt Layer Structures," Scipentific Reports, pp. 1-9, Jan. 22, 2018.

A.V. Scherbakov et al., "Optical Excitation of Single- and Multimode Magnetization Precession in Fe—Ga Nanolayers," Physical Review Applied, pp. 1-7, May 2, 2019.

Valynn Katrine Mag-Usara et al, "Spintronic Thz Generation Using a Silicon-based Fe/Pt Bilayer as the Radiation Scorce," 2019 $44^{th}$ International Conference on Infrared, Millimeter, and Terahertz Waves (IIRMMW-THz), pp. 1-2, Oct. 21, 2019.

U. Nandi et al., "Antenna-coupled spintronic terahertz emitters driven by a 1550 nm femtosecond laser oscillator," Applied Physics Letters, pp. 1-5, Jul. 9, 2019.

Shihao Zhuang et al., "An Ultra-narrowband, Acoustically Mediated Spintronic Terahertz Emitter, arXiv: 2005.00629v1," pp. 1-27, May 1, 2020.

* cited by examiner

NARROWBAND, ACOUSTICALLY MEDIATED SPINTRONIC TERAHERTZ EMITTER

BACKGROUND

The ability to generate terahertz (THz) radiation, the frequency range of 0.1-10 THz, from short laser pulses in the visible or near-infrared range was a milestone in THz technology. It has enabled the development of the THz time-domain spectroscopy (THz-TDS), which relies on the use of a femtosecond (fs) time-scale laser pulse to pump the THz emitter. THz-TDS allows for analyzing the THz spectroscopic fingerprints of a wide variety of materials (e.g., drugs, DNAs, explosives) in a non-destructive manner, and thereby has enabled widespread applications in biology, medicine, pharmaceutics, and security scanning. Notably, since many common packaging materials (e.g., paper, cardboard, and most plastics) are transparent to waves below 3 THz, materials can often be identified without the need to open the package, which is particularly useful to security scanning.

Spintronic THz emitters (STEs) have emerged as promising THz emitters for use in THz-TDS, due to their simple structure, low-cost, high scalability, large THz field magnitude, and tunable THz spectra by an applied magnetic field. A typical STE comprises a ferromagnetic (FM)/heavy-metal (HM)/substrate heterostructure, where a fs laser pulse is pumped onto the FM film and generates a picosecond (ps) spin current pulse via ultrafast demagnetization. The ps spin current pulse flows from the FM film to the HM film where it then transforms into a ps charge current pulse via the inverse Spin Hall Effect (iSHE). Such an ultrafast charge current produces a strong pulsed THz electric field, $E_{THz}(t)$. STEs based on juxtaposed ferrimagnetic (or antiferromagnetic) films and HM films have also been demonstrated.

The THz pulses from current fs-laser-excited emitters have a relatively broad bandwidth (typically, >1 THz), which leads to relatively low spectral resolution. Therefore, if two materials possess relatively close central peak frequencies in their THz spectra—for example, the central peak frequencies of RDX and PE4 (two common explosives) in absorption spectra are located at 0.65 THz and 0.66 THz, respectively—it would be challenging or even impossible to distinguish them using the existing broadband THz sources.

SUMMARY

Heterostructures that can be used in acoustically mediated spintronic THz emitters for applications such as THz time-domain spectrometry are provided.

One embodiment of a heterostructure includes: a transducer layer having a light receiving surface and consisting of a metal selected from the group consisting of aluminum, iron, platinum, gold, cobalt, and nickel; a thermal insulation layer adjacent to a surface of the transducer layer opposite the light receiving surface; a magnetic layer comprising a ferromagnetic or ferrimagnetic material adjacent to a surface of the thermal insulation layer opposite the transducer layer, such that the thermal insulation layer is disposed between the transducer layer and the magnetic layer; and a heavy metal layer comprising a heavy metal adjacent to a surface of the magnetic layer opposite the thermal insulation layer, such that the magnetic layer is disposed between the thermal insulation layer and the heavy metal layer.

One embodiment of a terahertz emitter includes: a heterostructure of a type described herein; and a femtosecond pulse laser positioned to direct femtosecond laser pulses onto the light receiving surface of the heterostructure's transducer layer.

One embodiment of a terahertz time-domain spectrometer comprising: a femtosecond pulse laser that emits a pulsed femtosecond laser beam; a beam splitter in a path of the pulse femtosecond laser beam, wherein the beam splitter splits the pulsed femtosecond laser beam into a pump beam and a probe beam; a heterostructure of a type described herein configured in a path of the pump beam such that the pump beam irradiates the heterostructure's transducer layer; a terahertz detector, configured to detect a terahertz pulse output signal emitted from the heterostructure; and a delay line assembly configured in the path of the probe beam to create an adjustable time delay in the probe beam and to direct the probe beam onto the terahertz detector.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Acoustically mediated spintronic THz emitters in which sound waves, rather than direct light pulses, give rise to a spin current are provided. Also provided are THz time-domain spectrometers (THz-TDSs) that incorporate the THz emitters.

Figure 1:
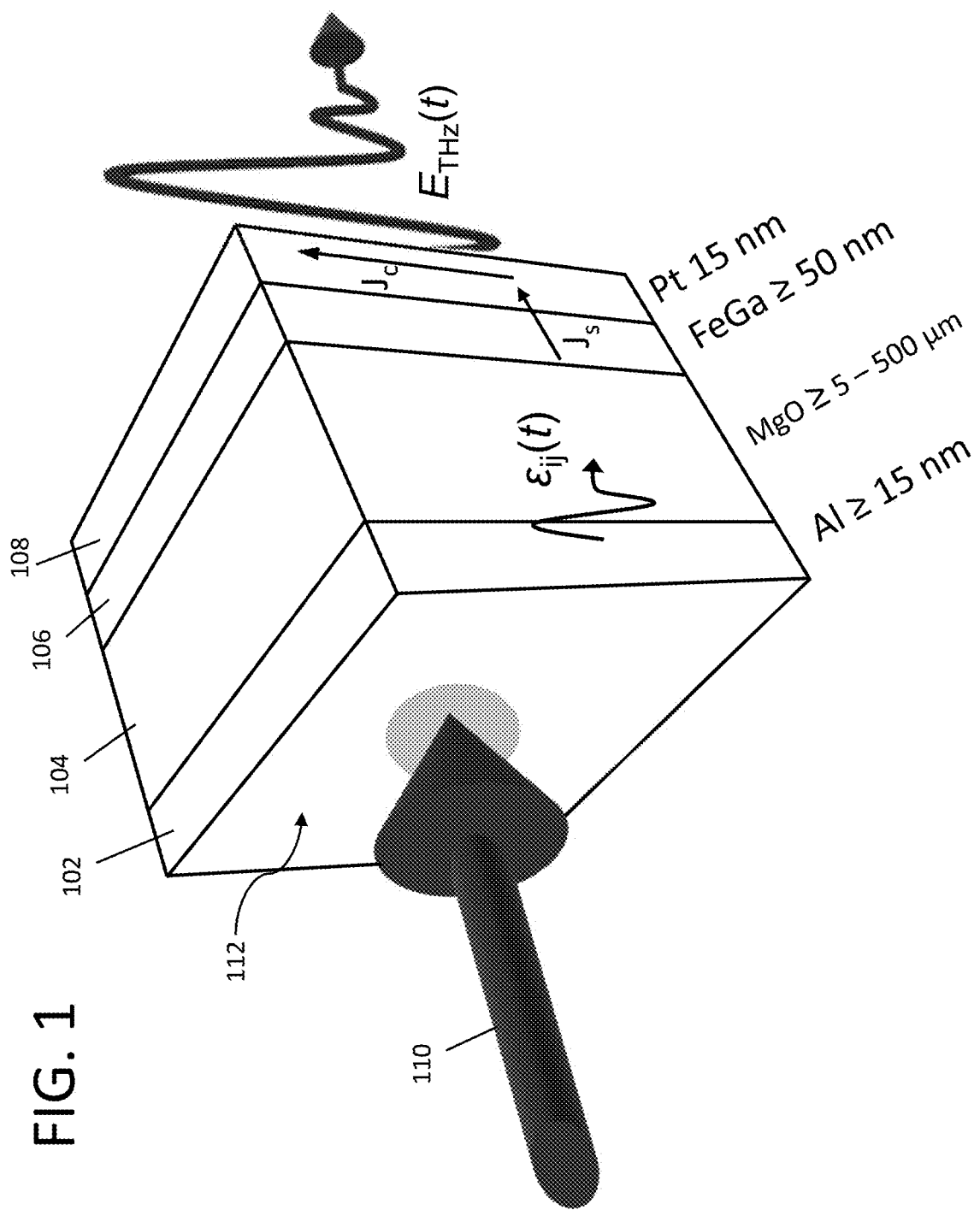
FIG. 1 is a schematic diagram of one embodiment of an acoustically mediated STE (acousto-STE). In this device THz emission is generated by a transverse ps time-scale charge current pulse (vertical arrow) in a heavy-metal (HM) layer, which is generated from a sound-wave driven ps time-scale spin current pulse (horizontal arrow) in a magnetic layer.

The spintronic THz emitters are based on a stacked, multilayered heterostructure, one embodiment of which is shown in FIG. 1. The layers of the heterostructure are a metal transducer layer 102, a thermal insulation layer 104, a magnetic layer 106, and a heavy metal layer 108. Transducer layer 102 is so-called because it acts as a light-to-acoustic transducer to convert fs time-scale laser pulses 110 incident upon its outermost surface, which is referred to herein as a light receiving surface 112, into ps time-scale acoustic pulses ($\varepsilon_{ij}$). When the acoustic pulses are injected into magnetic layer 106, high-frequency (sub-THz) spin waves are excited through magnetoelastic coupling and short-range exchange coupling. Via the iSHE, this transient spin current ($J_s$) is converted into a transient in-plane charge current ($J_c$) in adjacent heavy metal layer 108, which gives rise to narrowband THz radiation emission ($E_{THz}(t)$) having a peak frequency at the lower end of the THz region of the electromagnetic spectrum.

For the purposes of illustration, suitable materials and layer thicknesses are provided for the heterostructure of FIG. 1. However, as discussed in more detail below, different materials and layer thicknesses can be used.

Metals from which transducer layer 102 can be made include aluminum (Al), Iron (Fe), platinum (Pt), gold (Au), cobalt (Co), and Nickel (Ni). Thermal expansion coefficient, electron-phonon coupling coefficients, and electronic specific heat coefficient are the key properties that need to be considered when choosing materials for use as transducer layers. Specifically, to generate larger strains, it is better to simultaneously have large thermal expansion coefficient, large electron-phonon coupling coefficient, and small electronic specific heat coefficient. Transducer layer 102 should have a thickness that is at least as large as the absorption depth of the laser pulses in the metal in order to prevent the laser radiation from reaching the thermally insulating layer. However, the transducer layer should be sufficiently thin to produce THz radiation with an amplitude that is sufficiently large for the intended application. Generally, a thinner transducer layer provides a larger temperature gradient across the interface between the transducer layer and the thermal insulation layer. This is advantageous because it leads to the injection of larger strains into the magnetic layer, which results in THz emission with a higher amplitude. The optimal thickness of the metal transducer layer will depend on the particular metal being used and the required magnitude of the THz output signal. However, by way of illustration, layer thicknesses in the range from about 10 nm to about 30 nm, including thicknesses in the range from about 15 nm to 20 nm, are suitable. The metal transducer layer may be single-crystalline or polycrystalline or amorphous, and can be formed on the surface of the substrate using known deposition methods, such as magnetron sputtering or electron beam (e-beam) evaporation followed by an anneal.

Thermal insulation layer 104 provides thermal insulation between transducer layer 102 and magnetic layer 106. The thermal insulation layer 104 is desirably thick enough to shield magnetic layer 106 from most or all of the heat deposited into the heterostructure by the laser pulses. However, because thermal insulation layer 104 increases the size of the heterostructure and introduces a time delay for the acoustic pulse as it travels from transducer layer 102 to magnetic layer 106, it may be desirable for some applications to limit the thickness of the thermal insulation to the thickness needed to provide adequate thermal insulation. By way of illustration, layer thicknesses in the range from about 300 nm to about 500 µm are typically suitable; however, thicknesses outside of this range can be used. Ideally, suitable material for use as the thermal insulation layer should simultaneously have low thermal conductivity (for better shielding the heat), have a lower thermal expansion coefficient than the transducer (for obtaining larger strains), be electronically insulating (for obtaining larger strains), and have a good acoustic match with the overlaid magnetic layer (which usually means high speed of sound) such that the acoustic wave would not become smaller in magnitude after entering the magnetic layer. Furthermore, it is even better if the thermal insulation layer can promote the epitaxial growth of a single-crystalline magnetic layer. Magnesium oxide (MgO) is one example of a thermally insulating material that can be used. Other examples include aluminum oxide ($Al_2O_3$), gadolinium oxide ($Gd_2O_3$), hafnium oxide ($HfO_2$), strontium titanate ($SrTiO_3$).

If it acts as an epitaxial growth layer, thermal insulation layer 104 will be a single-crystalline substrate. For example, the (001) surface of an MgO wafer can be used for the epitaxial growth of a layer of an iron-gallium alloy (FeGa) using, for example, molecular beam epitaxy (MBE) or pulsed laser deposition (PLD). Otherwise, the thermal insulation layer can be polycrystalline or amorphous. Methods of forming single-crystalline, polycrystalline, and amorphous layers of the thermal insulating layer include mechanical thinning of a purchased substrate. Alternatively, the thermal insulation layer can be grown on a growth substrate using thin-film deposition methods, such as MBE, PLD, or e-beam evaporation, wherein a sacrificial material layer separates the thermal insulation layer from the substrate. After the thin film is grown, the sacrificial layer can be selectively etched away using suitable chemical solutions (for example, some sacrificial layers are water-soluble) to release the thermal insulation layer. As a result, the released thermal insulation layer can be peeled off from the substrate, forming a freestanding membrane.

Magnetic layer 106 is composed of a ferromagnetic material having a tilted magnetization (M). As used herein, the phrase "tilted magnetization" refers to a magnetization vector that is aligned neither parallel to the in-plane direction of the magnetic layer nor perpendicular to the in-plane direction of the magnetic layer (i.e., parallel to the thickness direction (z-axis)), but is instead aligned at an angle between the parallel and perpendicular orientations. The tilted magnetization vector M is illustrated by the arrows in FIG. 7D. A tilted magnetization of the magnetic layer can be induced using a magnetic field generator that applies an external magnetic field to the layer or by introducing residual strains into the magnetic layer. A magnetic field generator may comprise, for example, one or more magnets positioned around the layer to create the desired external magnetic field. When an acoustic pulse is injected from thermal insulation layer 104 into magnetic layer 106, it triggers the precession of the local magnetization vectors. This perturbation of the magnetization launches a spin wave along the thickness direction of magnetic layer 106 via magnetoelastic coupling and short-range exchange coupling.

The magnetic material from which magnetic layer 106 is made should provide strong magnetoelastic coupling. Ferromagnetic $Fe_{1-x}Ga_x$ binary alloys (0<x<1; FeGa alloys) are examples of magnetic materials that can be used. However, other ferromagnetic materials, including Fe, Co, Ni, and combinations of these elements with or without other elements (e.g., CoFe and CoFeB alloys), can also be used. Ferrimagnetic materials with strong magnetoelastic coupling, including magnetites ($Fe_3O_4$), cobalt ferrites ($CoFe_2O_4$), yttrium iron garnet ($Y_3Fe_5O_{12}$), and thulium iron garnet ($Tm_3Fe_5O_{12}$), can also be used. The magnetic layer can be a single-crystal layer or a polycrystalline layer or an amorphous layer. In most cases, a single-crystal layer will allow for larger perturbation of the local magnetization vector in the magnetic layer due to its stronger magnetoelastic coupling, which can provide a larger-amplitude THz output signal, relative to the output signal produced using a polycrystalline or an amorphous magnetic layer. However, a polycrystalline or an amorphous magnetic layer may be less expensive to produce and can provide a THz output signal having a sufficiently high amplitude for less demanding applications. Magnetic layer 106 is desirably thick enough to allow for sufficient coupling between the injected acoustic wave and the magnetization vectors of the magnetic material. Typically, a thickness of about 50 nm or greater will suffice for this purpose. The upper bound on the magnetic layer thickness is not strictly limited. However, thicker layers will result in some delay in the conversion of spin current to charge current and thicker crystalline layers may develop defects, which can result in a weaker signal. Typical upper thicknesses for the magnetic layer are about 200 nm. However, thicker layers can be used.

The ps time-scale evolution of the local magnetization vectors at the interface between magnetic layer 106 and heavy metal layer 108 can generate a ps time-scale spin current pulse in the latter, which is then converted to a ps time-scale in-plane electrical charge current pulse via the iSHE and, according to the Maxwell's equation for electromagnetism, the ps time-scale in-plane charge current pulse generates a THz electromagnetic wave pulse in the free space. The narrow bandwidth of the emitted THz pulse is determined by the shape of the injected ps time-scale acoustic wave. The heavy metal layer can be made from various heavy metals, including, platinum, tungsten, iridium, ruthenium, and tantalum. Typical layer thicknesses for a heavy metal layer are in the range from about 5 nm to about 20 nm. There are two principles that may be used to guide the selection of the optimal thickness of the heavy metal layer. First, the heavy metal layer should be at least as large as the diffusion length of the spin current in the heavy metal, such that the spin current can be largely absorbed and then converted into charge current. Otherwise, the generated spin current flowing from the magnet/heavy-metal interface will reflect from the free surface of the heavy metal layer and, in turn, cancel out the inflow of the spin current. Typical spin diffusion lengths of the above-mentioned heavy metals are in the range of about 1 nm-15 nm. Second, the heavy metal layer needs to be as thin as possible to maximize the average charge current density in it and hence the magnitude of the emitted THz pulse. This is because the magnitude of the spin current and hence the charge current decreases along the thickness direction of the heavy metal layer when the distance from the magnet/heavy-metal interface increases. The heavy metal layer can be a single-crystalline layer, a polycrystalline layer, or an amorphous layer.

Figure 2:
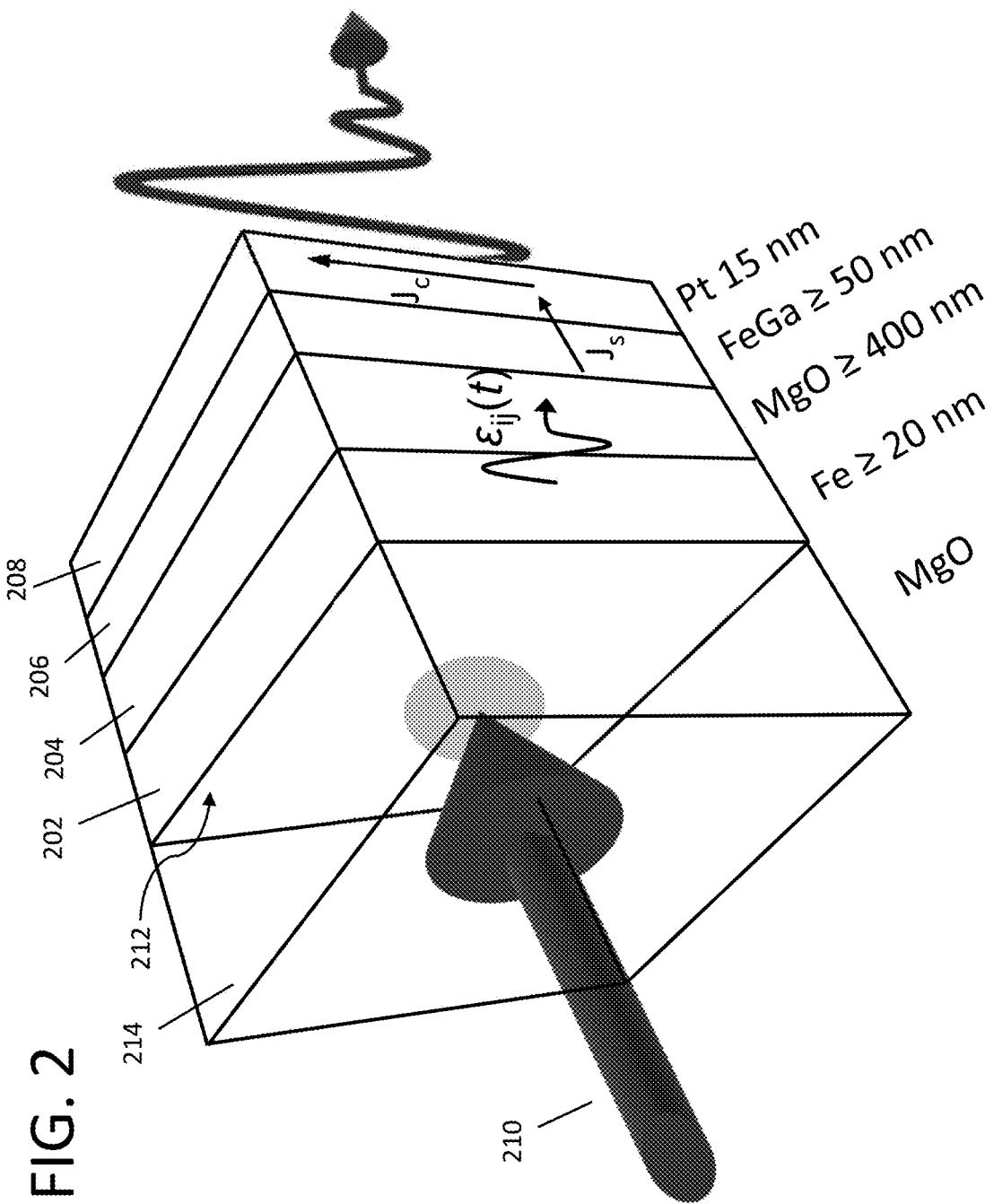
FIG. 2 is a schematic diagram of another embodiment of an acousto-STE.
Figure 3:
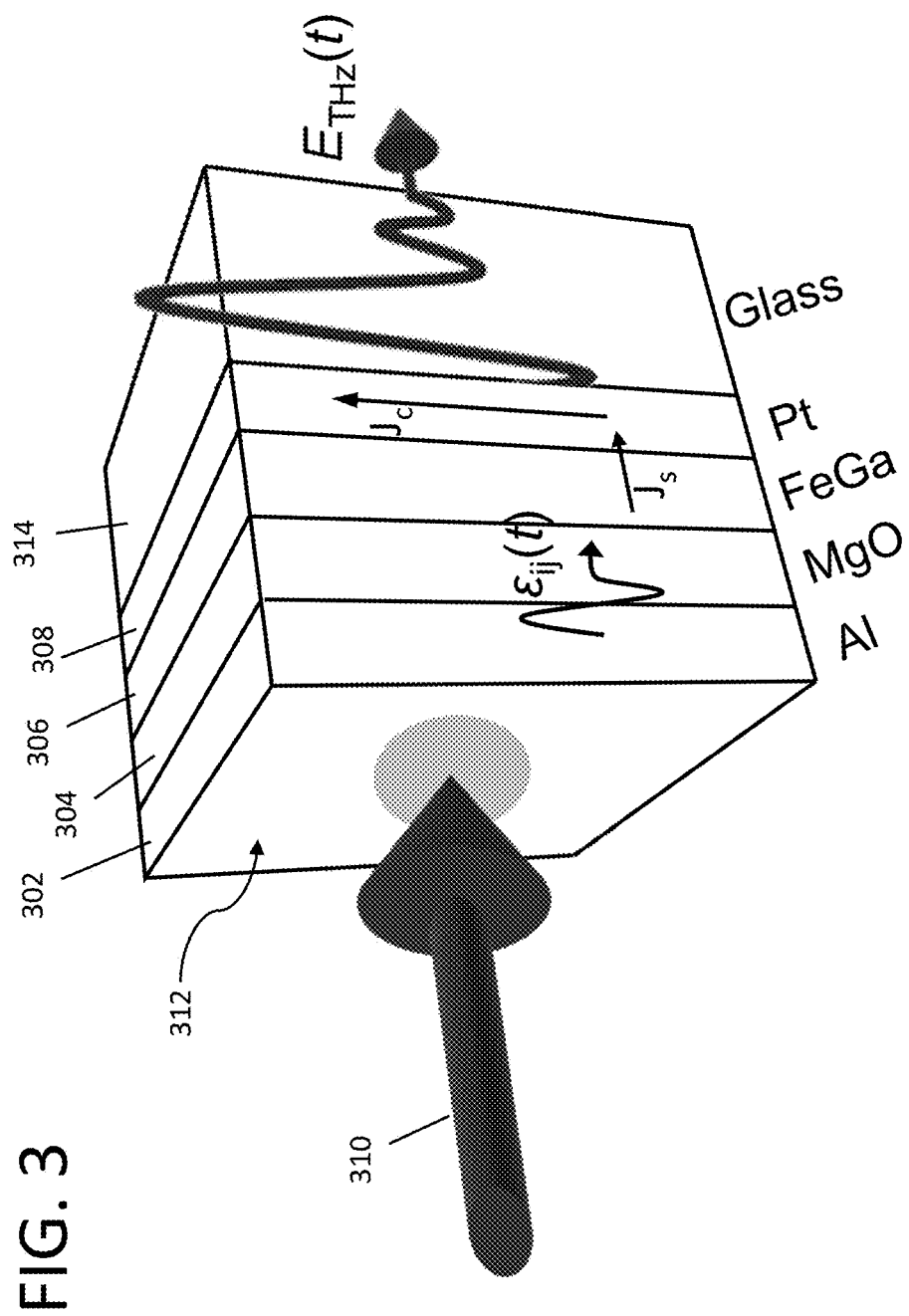
FIG. 3 is a schematic diagram of another embodiment of an acousto-STE.

For purposes of illustration, FIG. 2 and FIG. 3 show heterostructures that can be used as alternatives to the heterostructure of FIG. 1. In the heterostructure of FIG. 2, iron transducer layer 202 is grown on a single-crystalline (001) MgO growth substrate 214. A thin single-crystalline MgO thermal insulation layer 204 is then grown on transducer layer 202 using, for example, e-beam deposition. Magnetic layer 206 is a layer of single-crystalline FeGa, which may be grown epitaxially on MgO film 204. Heavy metal layer 208 is a layer of Pt. In addition, the heterostructure includes an MgO support substrate 214 adjacent to the light receiving surface 212 of transducer layer 202. The support substrate can be used to provide structural integrity and to protect the structure from oxidation and/or mechanical damage and should be made of a material that is optically transparent to laser pulses 210. For a material to be optically transparent to a laser pulse, it need not transmit 100% of the laser light (visible or near-infrared or near-ultraviolet). Rather it need only transmit enough of the light to generate a suitable acoustic wave in the transducer layer. For example, materials that transmit at least 70% of the laser pulse, at least 80% of the laser pulse, or at least 90% of the laser pulse can be characterized as optically transparent. Moreover, it is better to have an electronically insulating substrate so that the laser-excited hot electrons in the transducer layer will not diffuse into the substrate, which will in turn yield larger acoustic pulse. Other suitable support substrate materials include glass, mica, aluminum oxide, silicon oxide, and optically transparent polymers such as polydimethylsiloxane (PDMS).

In the heterostructure of FIG. 3, transducer layer 302 is a layer of aluminum having light receiving surface 312 for irradiation with a fs laser pulse 310, thermal insulation layer 304 is single-crystalline or polycrystalline MgO, magnetic layer 306 is a layer of polycrystalline FeGa, and heavy metal layer 308 is a layer of polycrystalline Pt. In addition, the heterostructure includes glass support substrate 314 adjacent to the THz output surface of heavy metal layer 308. The support substrate can be used to provide structural integrity and to protect the structure from oxidation and/or mechanical damage and should be made of a material that is transparent to the THz emission. For a material to be transparent to the THz signal, it need not transmit 100% of the emitted THz electromagnetic wave. Rather, it need only transmit enough of the emitted THz electromagnetic wave to render the emitter suitable for its intended purpose. Thus, materials that transmit at least 70% of the THz output signal, at least 80% of the THz output signal, or at least 90% of the THz output signal can be characterized as transparent. Other suitable support substrate materials include quartz, sapphire, glass, and silicon.

Although FIG. 1-FIG. 3 include illustrative materials and thicknesses for the various layers in the structures, it should be understood that other materials and layer thicknesses can be used, provided that the layers are able to carry out their respective functions, as described above, to produce an operable THz emitter.

The lasers for the spintronic terahertz emitters shown in FIGS. 1-3 are positioned to direct pulsed femtosecond time-scale laser pulses along the z-axis onto the light receiving surfaces of the transducer layers. As used herein, femtosecond time-scale laser pulses are pulses having a pulse duration in the range from 1 fs to 100 fs. This includes femtosecond time-scale laser pulses having a pulse duration in the range from 5 fs to 100 fs and further includes femtosecond time-scale laser pulses having a pulse duration in the range from 10 fs to 60 fs. Femtosecond time-scale laser pulses are also referred to herein as fs pulses or fs laser pulses. The laser light includes wavelengths in the visible, near-infrared, and near-ultraviolet regions of the electromagnetic spectrum. For example, wavelengths in the range from about 300 nm to 1100 nm can be used, preferably within the range from about 600 nm to 1000 nm. The laser spot size can cover the entire light receiving surface, or only a portion thereof. However, it can be advantageous to irradiate the full surface area of the light receiving surface in order to increase the input power of the device. The bandwidth and peak frequency of the emitted THz radiation will depend on the materials and construction of emitter. However, as illustrated in the Example, embodiments of the THz emitters described herein can provide THz emission with bandwidths smaller than 0.1 THz, including bandwidths smaller than 0.05 THz and bandwidths smaller than 0.02 THz, and peak frequencies in the range from 0.1 to 1 THz. By way of illustration only, THz emission with bandwidths in the range from 0.005 to 0.05 can be achieved.

If desired, the peak frequency of the emitted THz radiation can be adjusted applying two (or more) consecutive fs time-scale laser pulses to the transducer layer, wherein, one of laser pulses is delayed by a time duration $\Delta t_d$. As illustrated in the Example below, the peak frequency of the emitted $E_{THz}(t)$ can be shifted to higher or lower frequencies depending on the $\Delta t_d$. This shift arises because the consecutive laser pulses lead to the injection of two consecutive longitudinal acoustic pulses and the spin waves excited by these two acoustic pulses interact with each other and alter the relative weight of difference frequency modes in the entire spin wave package, leading to the shift in the frequency spectra of the emitted THz wave.

Figure 4:
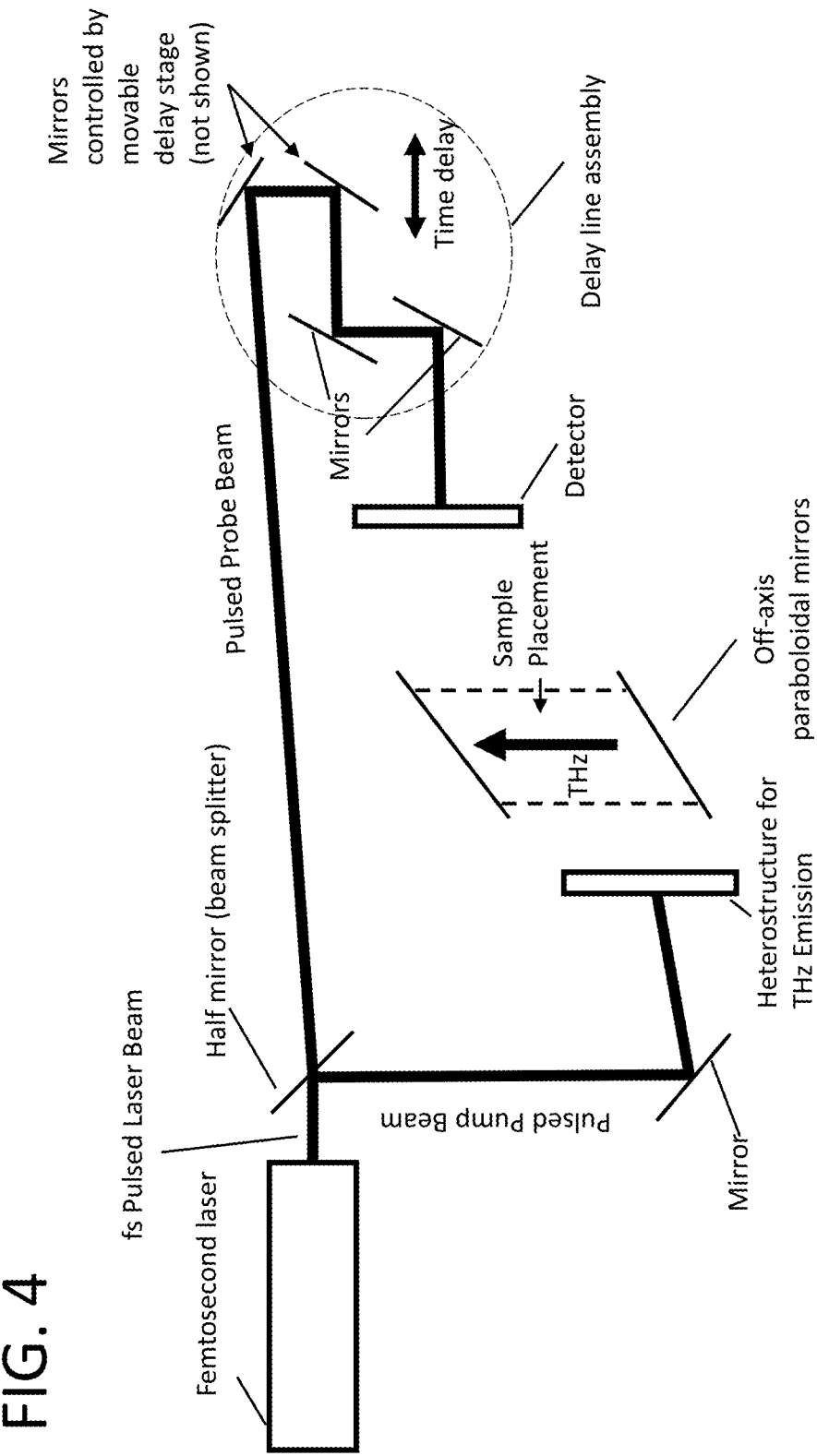
FIG. 4 is a schematic diagram of a THz time-domain spectrometer.

The THz emitters can be used as the THz radiation source in a THz-TDS system. THz-TDS is a spectroscopic technique for determining the properties of a sample, such as refractive index, dielectric constants, and/or absorption coefficients, by probing the sample with short pulses of terahertz radiation. One embodiment of a THz-TDS spectrometer is shown schematically in FIG. 4. The spectrometer includes a femtosecond pulsed laser that emits a pulsed laser beam and a beam splitter positioned in a path of the laser beam. The beam splitter splits the pulsed femtosecond laser beam into a pump beam and a probe beam. Common beam splitters include half-silvered mirrors, prism pairs, and dichroic mirrored prisms. A heterostructure of the type described herein is located in the path of the pump beam such that the femtosecond pulsed pump beam irradiates the light receiving surface of the heterostructure to generate a THz emission. Alternatively, a first femtosecond pulse laser can be used to generate the pump beam and a second femtosecond laser can be used to generate the probe beam. In this latter embodiment, the beam splitter can be omitted.

The sample to be studied is placed in the path of the THz emission and a THz detector is positioned to measure the THz radiation emitted from the heterostructure after it has passed through the sample or has been reflected from the surface of the sample. Photoconductive antennae and electro-optical crystals are examples of suitable detectors. Mirrors, such as parabolic mirrors can be used to guide the THz pulses from the heterostructure to the sample and then onto the THz detector. The probe beam is also directed onto the THz detector. A delay line assembly is configured in the path of the femtosecond pulsed probe beam to create an adjustable time delay in the probe beam and to direct the probe beam onto the terahertz detector. As shown FIG. 4, the delay line assembly may comprise a series mirrors from which the probe beam is reflected. One of more of the mirrors in the delay line assembly is controlled by a movable delay stage (e.g., a motorized delay stage) that allows for the adjustment of the probe beam path length.

During the operation of the spectrometer, the electric fields of the THz pulses having ps time scales interact with the probe laser pulses. This produces an electrical signal which is proportional to the electric field of the THz pulse. By varying the arrival time of the laser pulse with respect to the THz signal using the delay line assembly, the electric field amplitude and phase of the THz pulse can be mapped out as a function of time. Commercially available software can be used to collect the electric field amplitude as a function of time using a digital lock-in amplifier that measures the signal from the detector. This measured time-domain data can be transformed into frequency-domain spectra via a fast Fourier transform.

Because the spintronic THz emitters described herein are able to provide ultra-narrowband THz emission, the THz-TDS spectrometers provide very high spectral resolution and are able to distinguish between samples having central peak frequencies in their THz spectra that differ by 0.05 THz or less, and even those that differ by 0.02 or 0.01 THz or less.

EXAMPLE

The first example demonstrates that, by adding a metallic transducer layer to the multilayer structure of a conventional STE, the emitted THz wave will change from a broadband (bandwidth>0.5 THz) to an ultra-narrowband (bandwidth ~0.01 THz) source. The architecture of the proposed acousto-STE (type-1) is illustrated in FIG. 1. The peak frequencies of the emitted wave will be shifted from the upper-end of the THz spectra (1-10 THz) to its lower-end (0.1-1 THz).

Figure 5A:
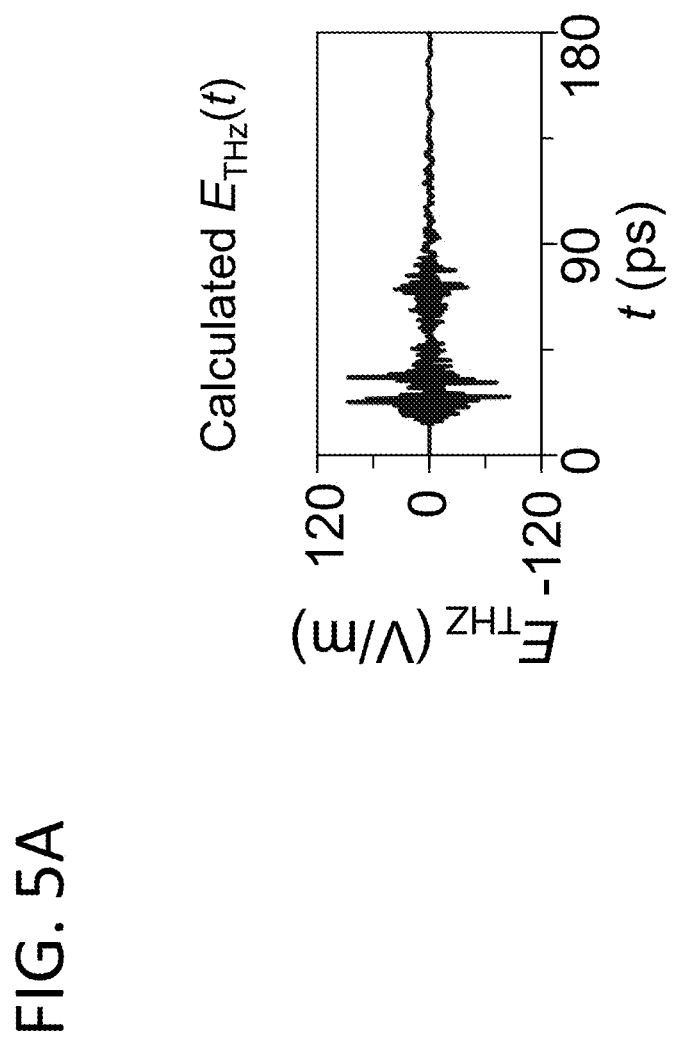
FIG. 5A shows calculated $E_{THz}(t)$ of the acousto-STE shown in FIG. 1 and discussed in the Example.
Figure 5B:
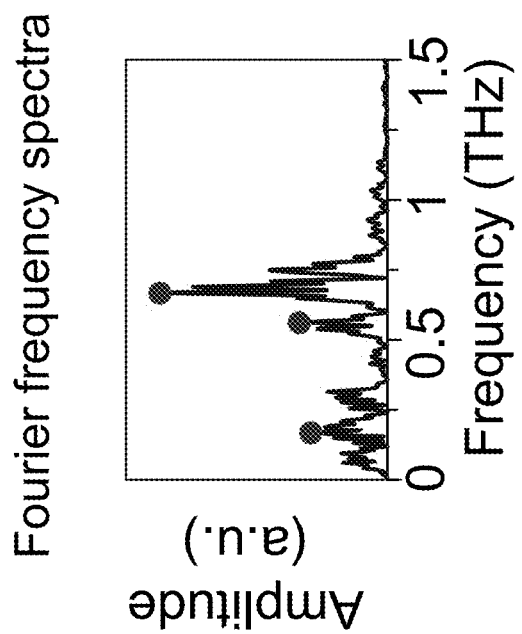
FIG. 5B shows its Fourier frequency spectra. The three highest peaks are indicated with solid dots. Absorbed laser fluence: 1.3 mJ/cm$^2$; Wave length: 800 nm; laser pulse duration: 20 fs; laser beam diameter: 5.4 mm.
Figure 5C:
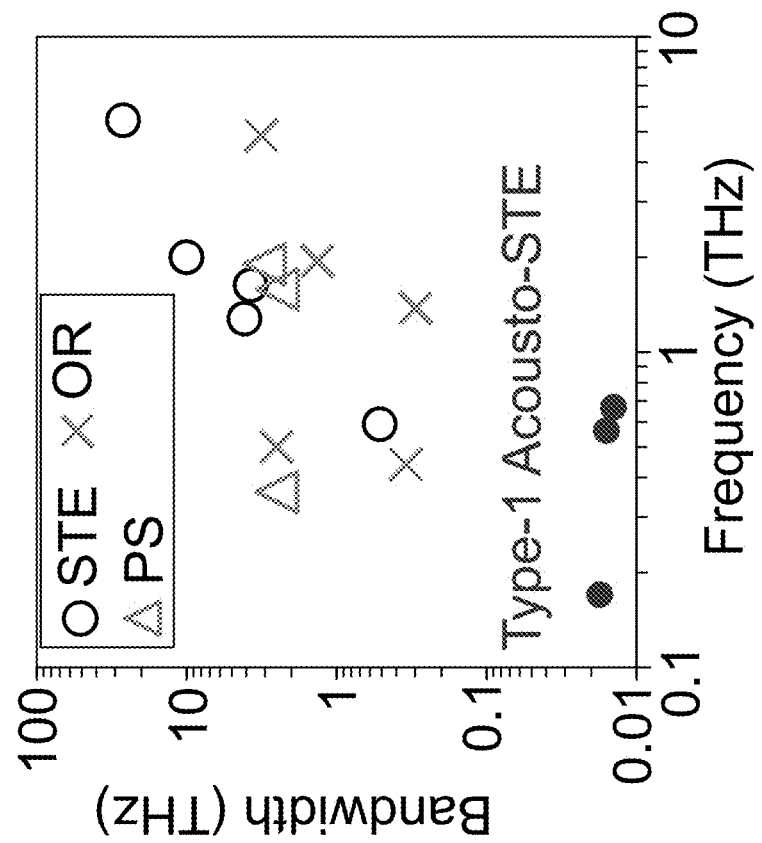
FIG. 5C compares the peak frequencies and bandwidths of the acousto-STE, a conventional STE, and fs-laser-excited THz emitters operating based on photoconductive switch (PS, e.g., GaAs) or optical rectification (OR, e.g., ZnTe). The comparative data shown in FIG. 5A is reported in: Seifert, T. et al. *Nat. Photonics* 10, 483 (2016); Klatt, G. et al. *Opt. Express* 18, 4939-4947 (2010); Matthaus, G. et al. *Opt. Commun.* 261, 114-117 (2006); Hoffmann, M. C. et al. *Opt. Express* 15, 11706-11713 (2007); and Schneider, A. et al. *J. Opt. Soc. Am. B* 23, 1822-1835 (2006).

Using an Al(15 nm)/MgO(substrate)/Fe$_{80}$Ga$_{20}$(100 nm)/Pt(15 nm) multilayer stack as an example, FIG. 5A shows the calculated $E_{THz}(t)$ emitted from the Fe$_{80}$Ga$_{20}$/Pt bilayer, and FIG. 5B shows its Fourier frequency spectra. The peak amplitude of the $E_{THz}$ (~100 V/m, FIG. 5A) is at the same scale as previously reported STEs, but its bandwidth (~0.01 THz) is at least one order of magnitude smaller. Note that this bandwidth is also at least one order of magnitude smaller than the fs-laser-excited THz emitters operating based on photoconductive switch or optical rectification, as summarized in FIG. 5C. Such an ultra-narrow bandwidth can enable a significantly improved spectral resolution of existing THz-TDS devices.

Figure 6A:
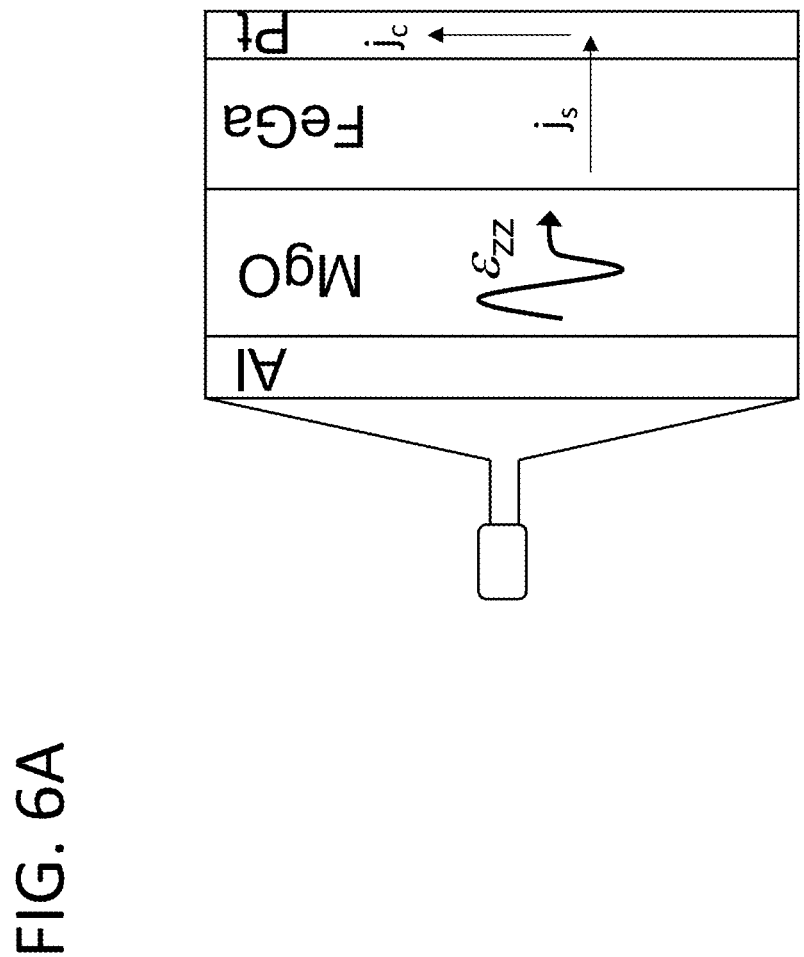
FIG. 6A shows a schematic (side view) of the acousto-STE of FIG. 1, where the incident fs laser pulse covers the entire Al film.
Figure 6B:
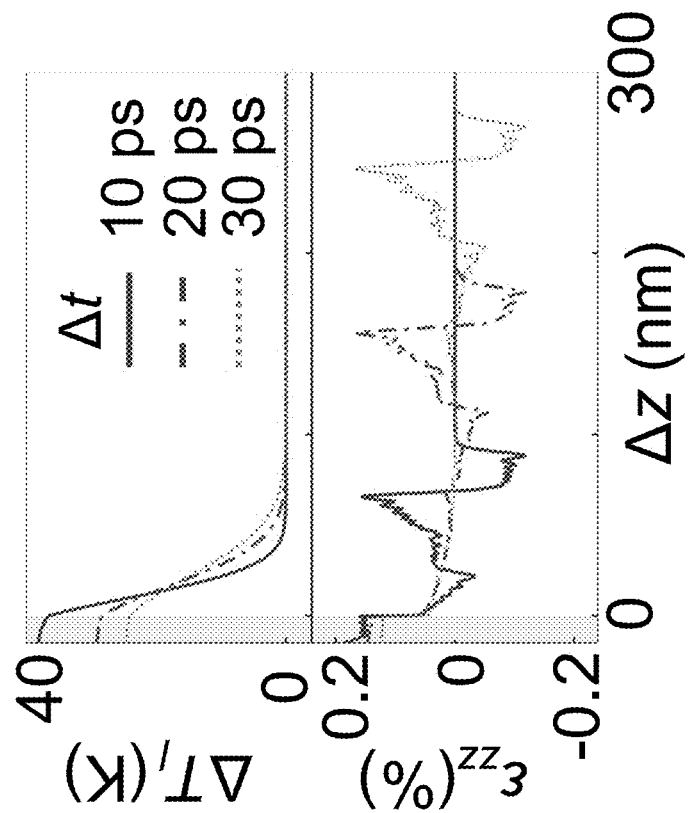
FIG. 6B shows profiles of the lattice temperature rise $\Delta T_1$ (top) and strain $\varepsilon_{zz}$ (bottom) across the thickness of the Al film (shaded area) and MgO at $\Delta t=10$ ps, 20 ps and 30 ps. Here $\Delta t=0$ ps is defined as the moment when laser pumping starts.
Figure 6C:
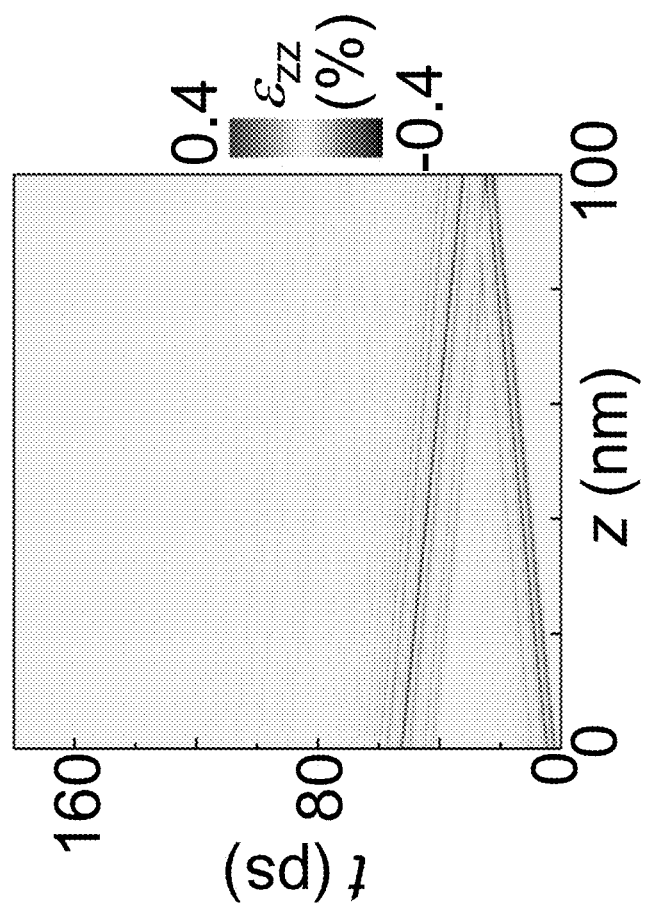
FIGS. 6C and 6D show propagation of the longitudinal acoustic wave (FIG. 6C) and spin wave (FIG. 6D) between the MgO/FeGa and the FeGa/Pt interfaces. Note that the $\varepsilon_{zz}$ and $\Delta m_z$ are evaluated using the mechanical displacement $u_z$ and the normalized perpendicular magnetization $m_z$ at $t=0$ ps as the reference, respectively, where t=0 ps is defined as the moment when the acoustic wave arrives at the MgO/FeGa interface for the first time.
Figure 6D:
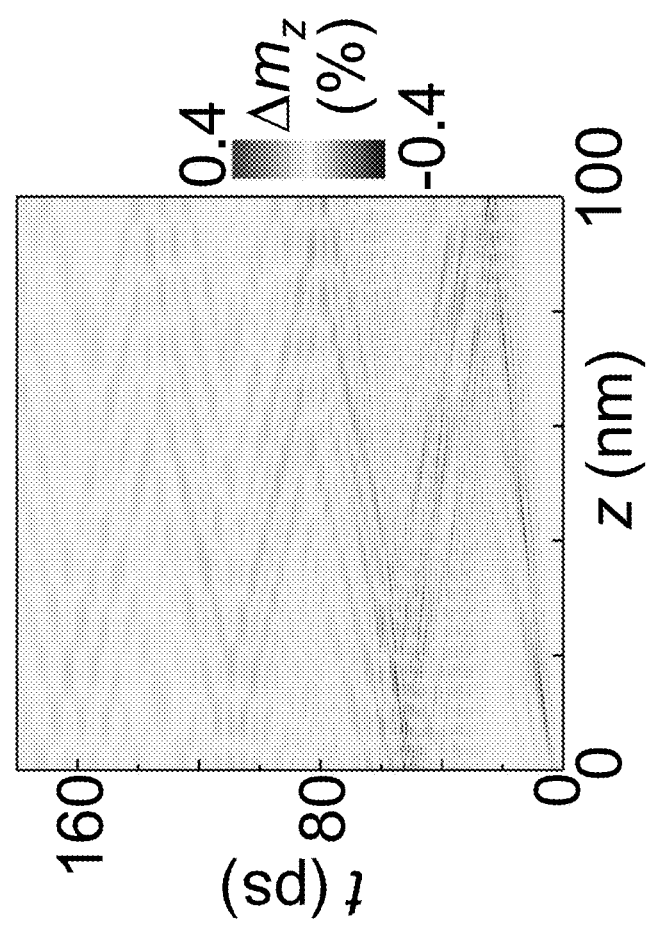
Figure 6E:
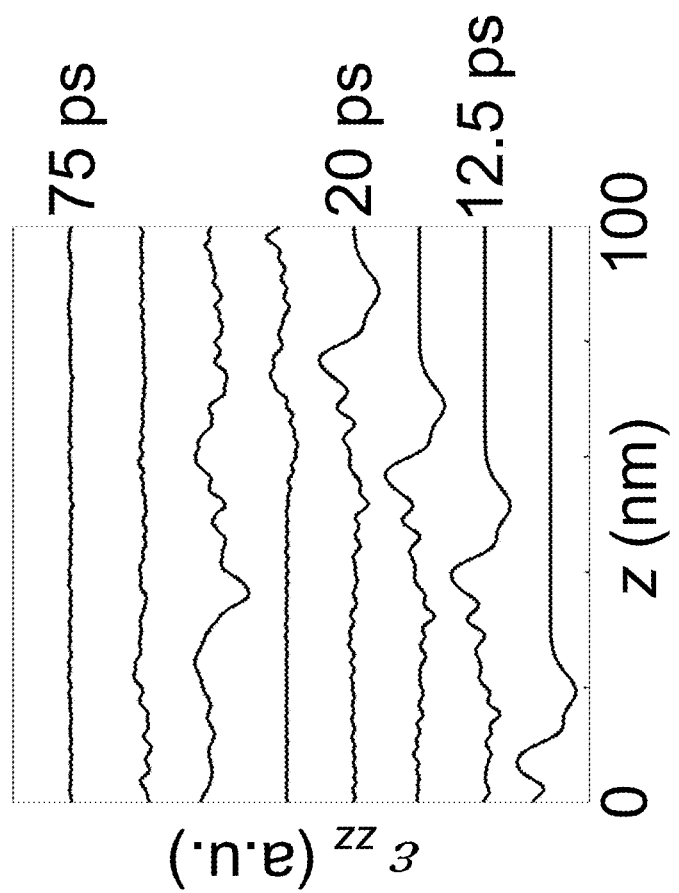
FIGS. 6E and 6F show profiles of an acoustic wave (FIG. 6E) and a spin wave (FIG. 6F) in the FeGa layer, (from bottom to top) at t=6, 12.5, 16, 20, 30, 45, 60, 75 ps, respectively. The curves are vertically displaced for clarity.
Figure 6F:
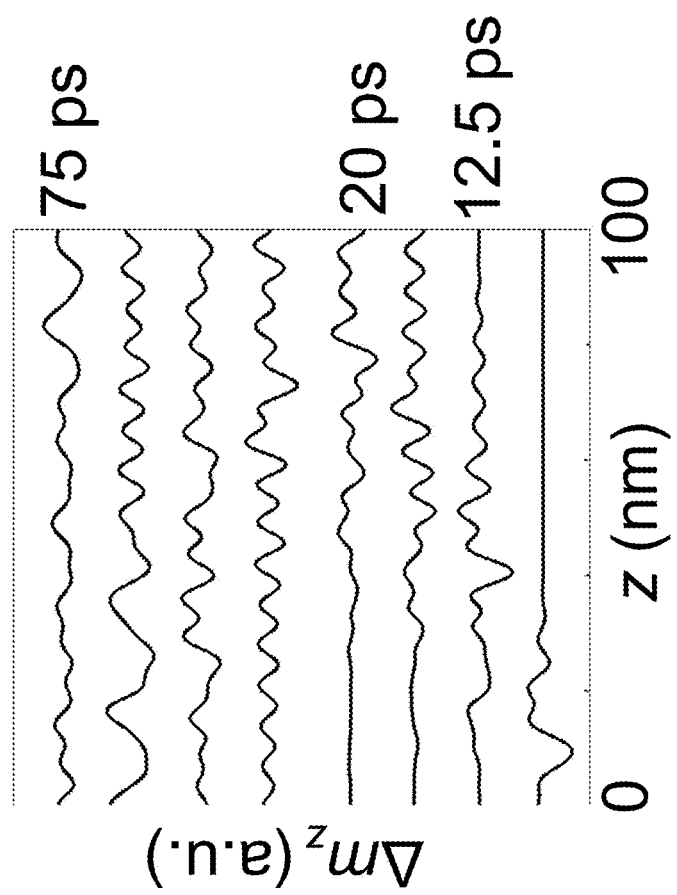

An incident laser beam with a diameter (~5.4 mm) was considered large enough to cover the entire Al transducer and ensure an almost uniform heating (see schematic in FIG. 6A). The thickness of the Al (15 nm) was much larger than the absorption length (~6.4 nm) of the Al to near infrared (wavelength: 800 nm) laser, such that all photons should have been adsorbed by the Al, thereby increasing the temperature of the electron subsystem. The photoexcited hot electrons then quickly exchanged energy with the lattice subsystem, leading to a rapid rise in the lattice temperature as well. As a result, a longitudinal acoustic wave $\varepsilon_{zz}(t)$ was injected from the Al into the MgO due to the generation of both the electronic and lattice thermal stress in Al. In parallel, heat transport from the hotter Al to the MgO also began. These coupled processes were described by coupling the classical two-temperature model with the heat transport equation, in which temperature-dependent materials properties (elastic stiffness, heat capacity, heat conductivity, and thermal expansion coefficient) in both the Al and MgO were considered. FIG. 6B shows the calculated profiles of lattice temperature and longitudinal acoustic wave in Al (shaded area) and MgO at 10, 20, and 30 ps after the laser pumping. The acoustic wave will then travel across the MgO/Fe$_{80}$Ga$_{20}$ and Fe$_{80}$Ga$_2$O/Pt interfaces, and reaches the stress-free top surface of Pt, where it will be reflected back into the Fe$_{80}$Ga$_2$O (FeGa hereafter) and then the MgO. Note that a small backward acoustic wave will rise every time the acoustic wave travels across an interface. FIG. 6C shows the propagation of acoustic waves inside the FeGa layer. These acoustic waves will trigger the precession of local magnetization in the FeGa via magnetoelastic coupling, thereby launching a spin wave. Different from the acoustic wave that can travel across interfaces, the spin wave is largely confined in the FeGa and reflected back and forth between the MgO/FeGa and the FeGa/Pt interfaces (see FIG. 6D). Profiles of the acoustic wave and spin wave at several key time stages are plotted in FIGS. 6E and 6F, respectively, which at least indicate two important features. First, the spin wave travels faster than the acoustic wave. Specifically, it takes 20 ps for the acoustic wave to travel from the bottom to the top surface of the FeGa (see FIG. 6E), which is consistent with the speed of sound in the FeGa and its thickness. However, it only takes 12.5 ps for the spin wave, which was initially excited at the MgO/FeGa interface, to arrive at the FeGa/Pt interface (see FIG. 6F). The high traveling speed of the spin wave primarily results from the short-range exchange coupling among neighboring magnetizations. Second, the acoustic wave, reflected from the FeGa/Pt interface and top surface of Pt, leaves the FeGa and enters the MgO at t=75 ps, leaving a negligibly small backward acoustic wave behind (see FIG. 6E). In contrast, the spin wave remains noticeable at the same time stage (c.f., the 75 ps curve in FIG. 6F). The attenuation of spin waves is mainly attributed to the spin current injection at the FeGa/Pt interface and the damping in the FeGa.

Figure 7A:
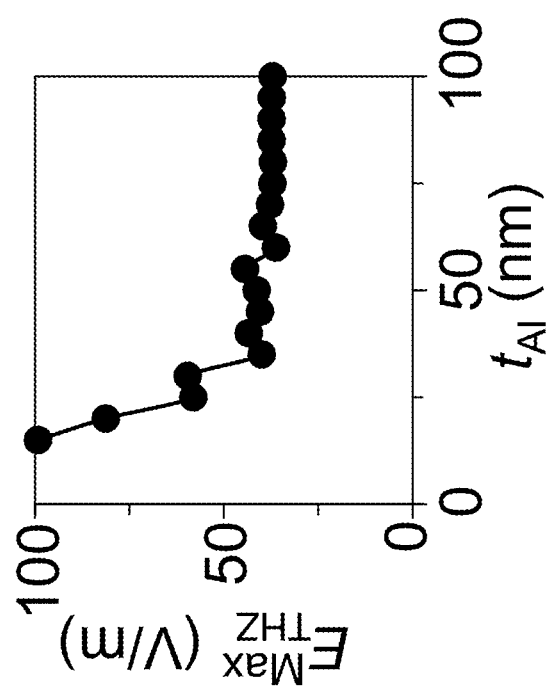
FIG. 7A shows the peak amplitude of the calculated $E_{THz}(t)$ emitted by the acousto-STE of FIG. 1 as a function of the Al film thickness $t_{Al}$.
Figure 7B:
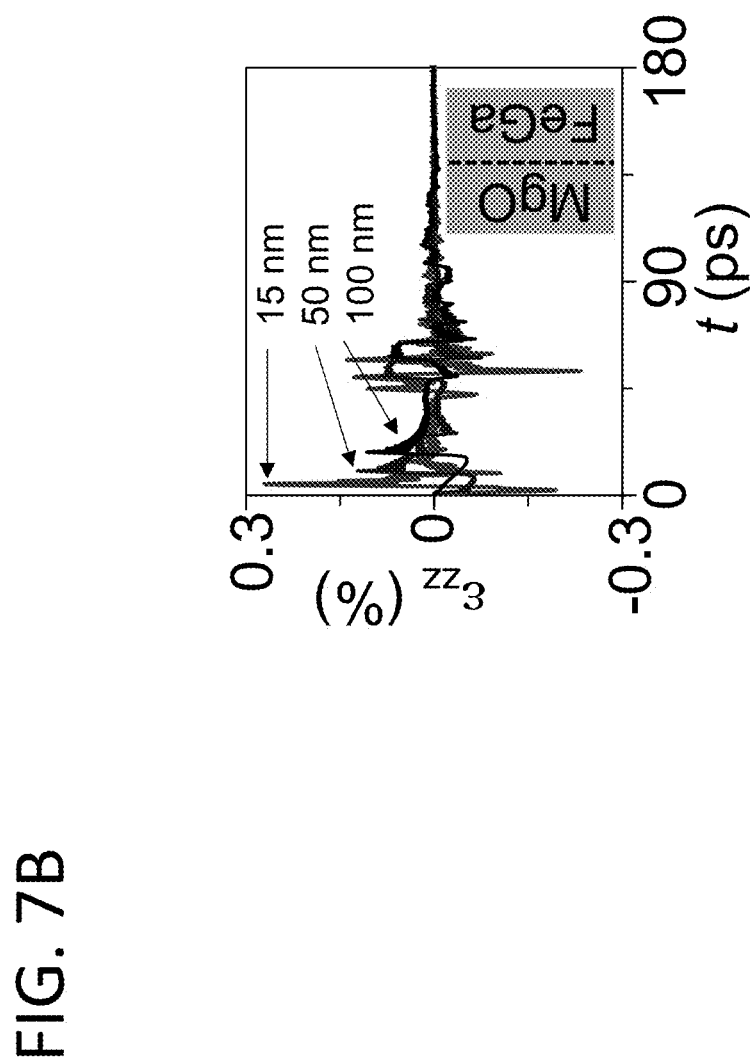
FIG. 7B shows the evolution of local strain at the MgO/FeGa interface (indicated by the dashed line of the inset) for different Al thicknesses.
Figure 7C:
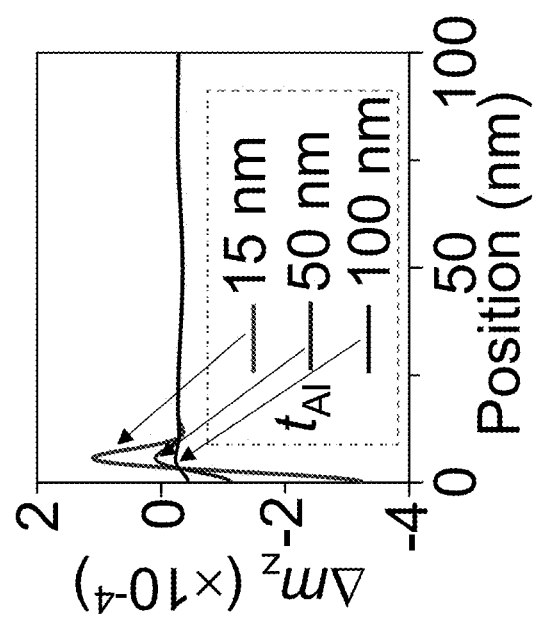
FIG. 7C shows profiles of local magnetization change across the thickness direction of the FeGa.
Figure 7D:
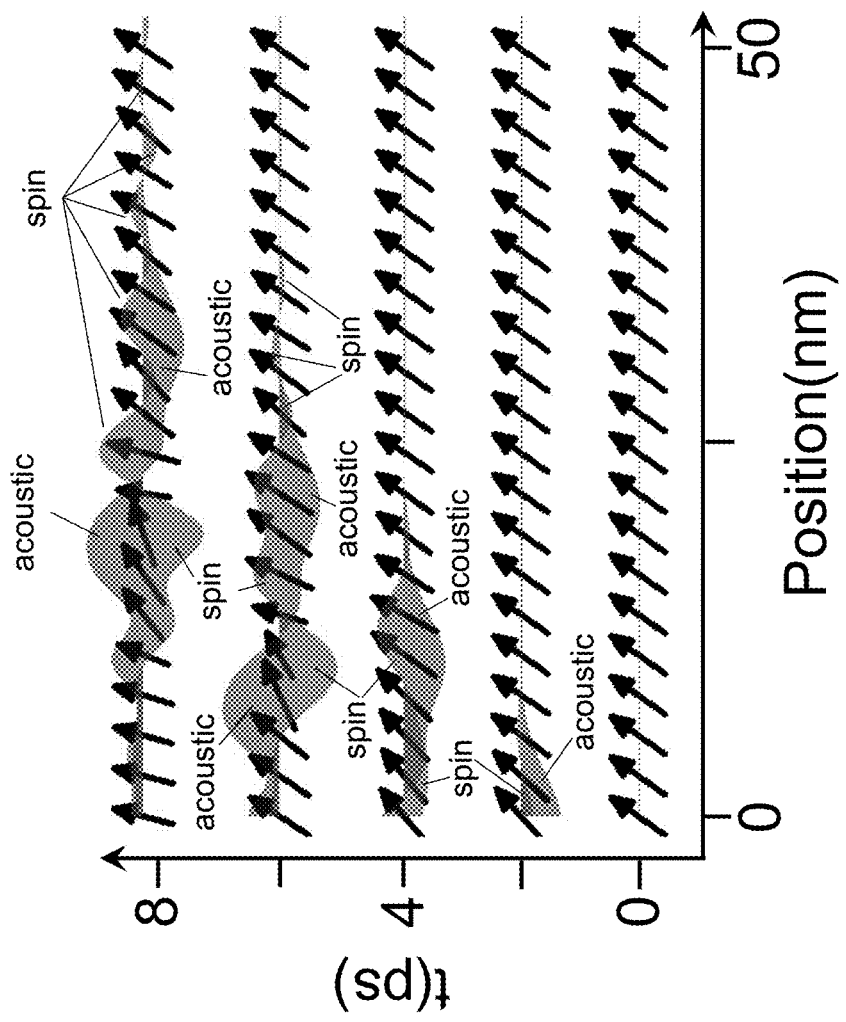
FIG. 7D shows acoustic waves excite the spin waves via the magnetoelastic coupling and the short-range exchange coupling between local magnetization vectors (the arrows). The spin wave travels faster than the acoustic wave.

It is further shown that the thickness of the Al layer influences the amplitude of the emitted THz pulse. As shown in FIG. 7A, the peak amplitude of the emitted $E_{THz}(t)$ reduces from 100 to 37 V/m when the Al film thickness increases from 15 nm to 100 nm. This is because a thinner Al film allows for greater temperature gradient across the Al/MgO interface, which further leads to the faster injection of strain pulse into the FeGa as well as larger magnitude for the strain pulse (FIG. 7B). These in turn induce larger perturbation of the local magnetization at the FeGa bottom surface via the magnetoelastic coupling (FIG. 7C), which then launches a larger-amplitude, sub-THz spin wave via the short-range exchange coupling (FIG. 7D).

Figure 8A:
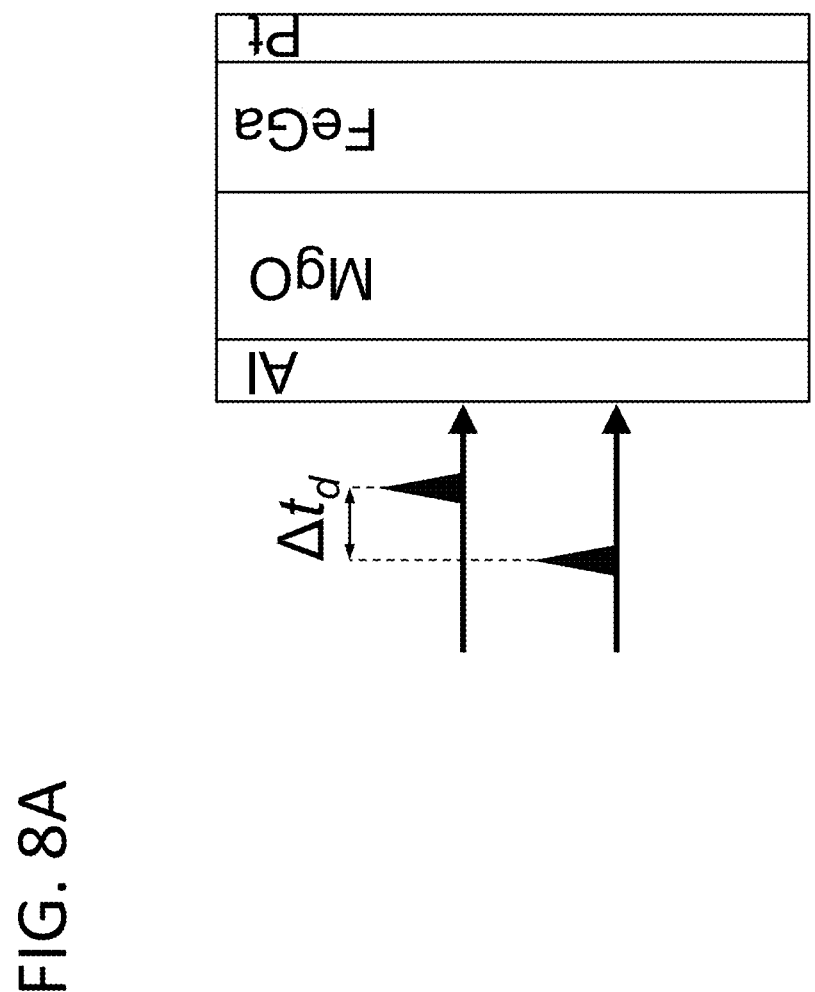
FIG. 8A shows a schematic (side view) of the acousto-STE of FIG. 1, where two identical femtosecond laser pulses are shined on the Al transducer. One of the two pulses is delayed by a time duration $\Delta t_d$.
Figure 8B:
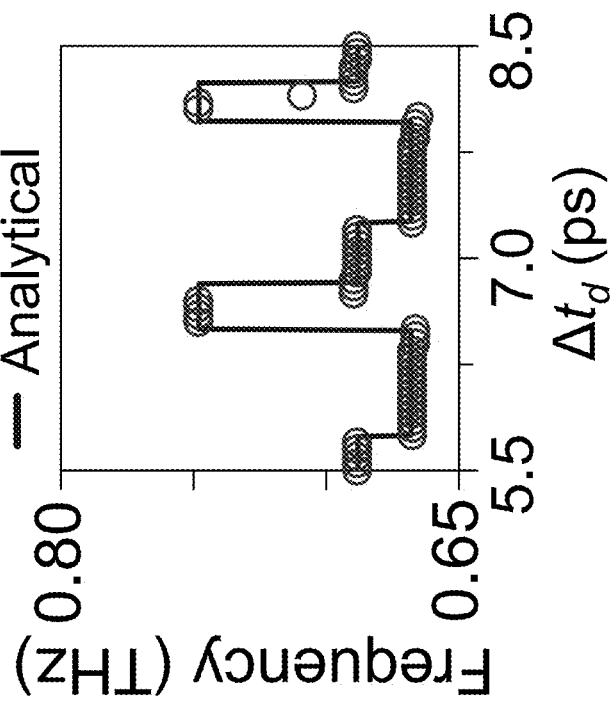
FIG. 8B shows highest peak frequency of the emitted THz pulse as $\Delta t_d$ increases from 0 ps to 15 ps with a 1-ps interval.
Figure 8C:
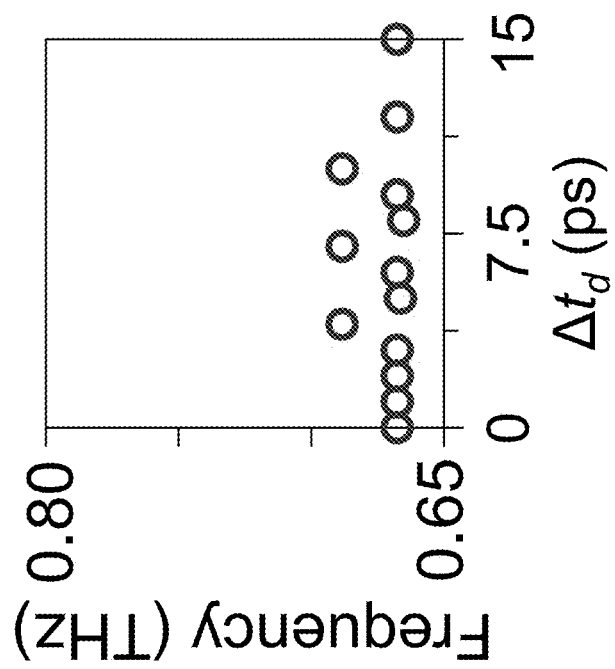
FIG. 8C shows the simulation results with an interval of 0.05 ps for 5.5 ps≤$\Delta t_d$≤8.5 ps. The simulation results can be interpreted using an analytical model.
Figure 8D:
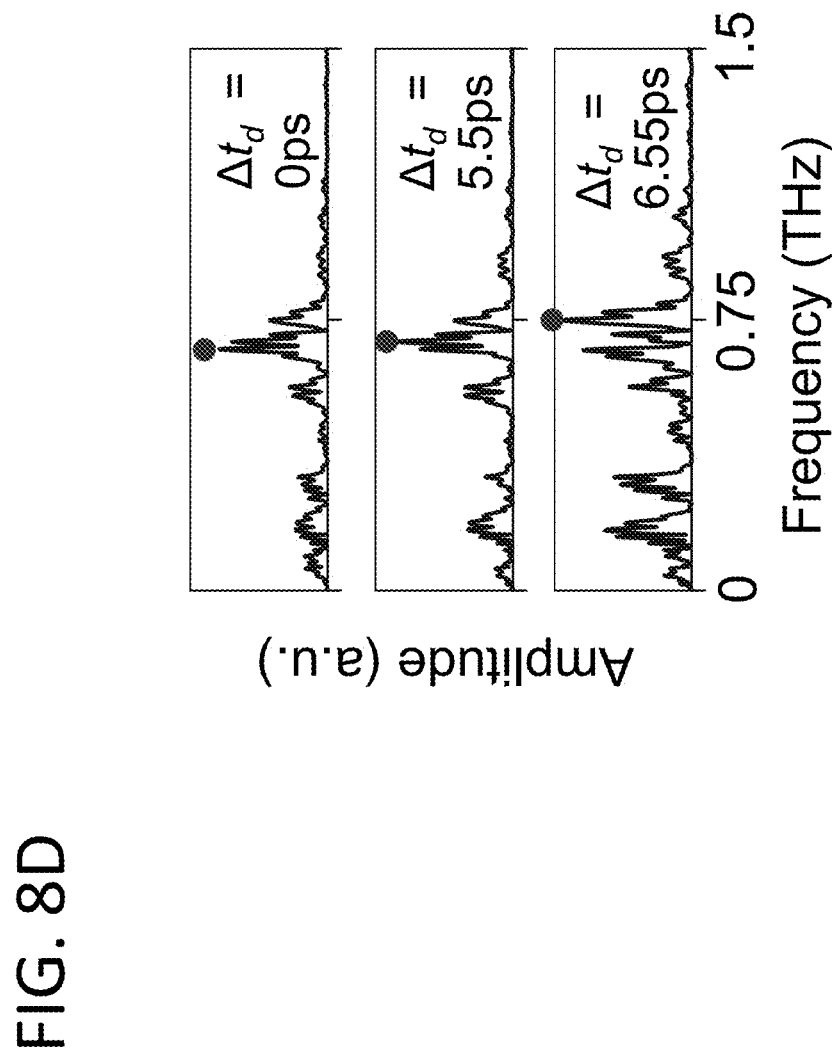
FIG. 8D shows Fourier frequency spectra of the emitted THz pulse when $\Delta t_d$=0 ps (top panel of FIG. 8D), $\Delta t_d$=5.5 ps (middle panel of FIG. 8D), and $\Delta t_d$=6.55 ps (bottom panel of FIG. 8D). The locations of the highest peaks in FIG. 8D are indicated by solid dots.
Figure 8E:
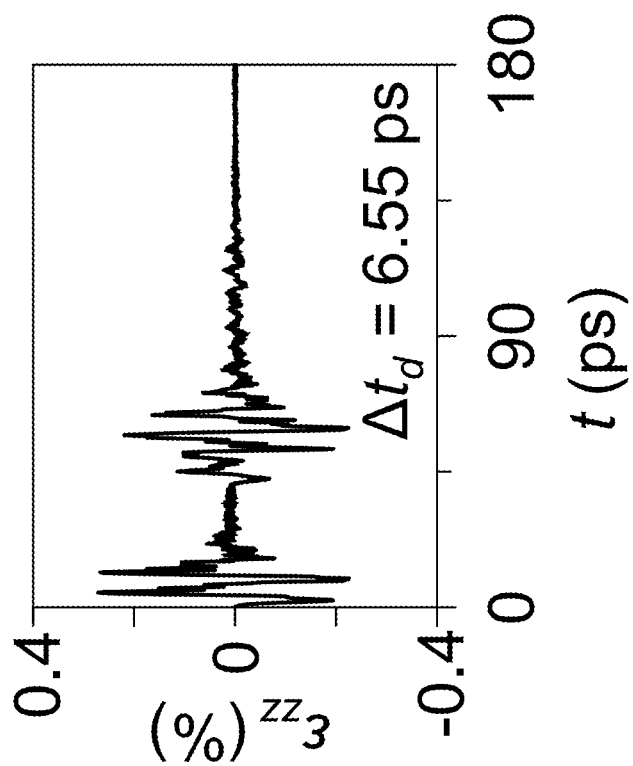
FIGS. 8E and 8F show (FIG. 8E) temporal evolution of the local strain $\varepsilon_{zz}$ at the MgO/FeGa interface and (FIG. 8F) the emitted THz electric field $E_{THz}$ when $\Delta t_d$=6.55 ps.
Figure 8F:
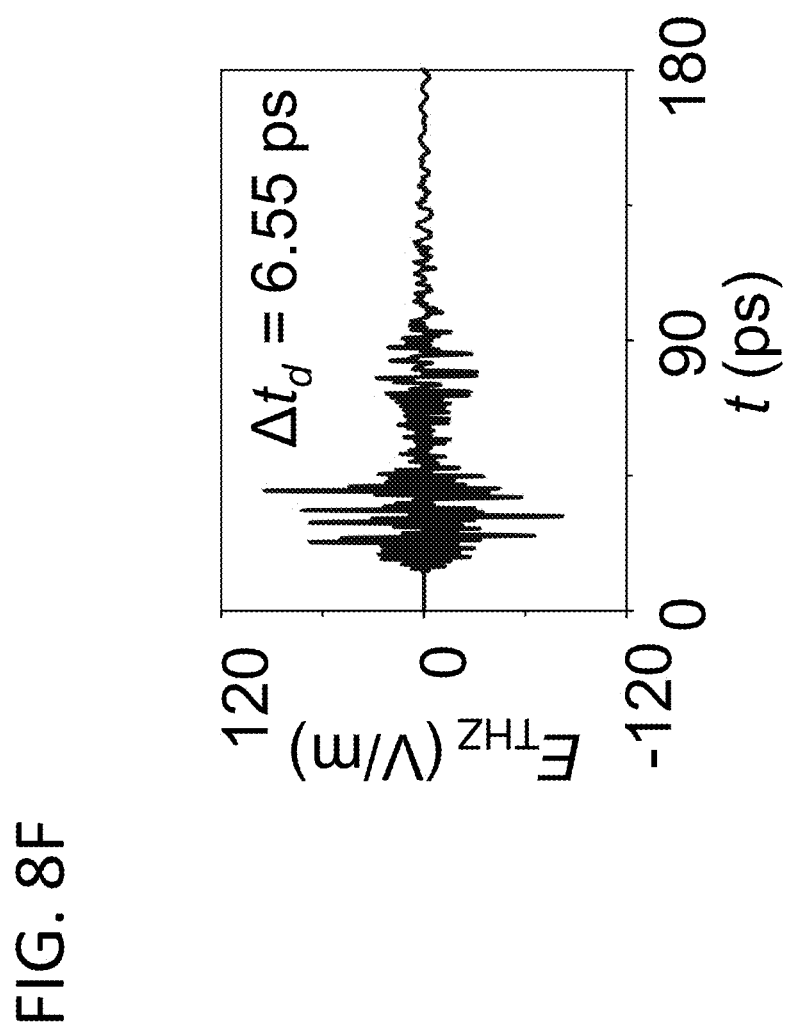

It is further shown that applying two (or more) consecutive fs laser pulses can shift the peak frequency of the emitted THz pulse. Consider two identical laser pulses, one of which was delayed by a time duration $\Delta t_d$ (FIG. 8A). As shown in FIG. 8B and FIG. 8C, the peak frequency of the emitted $E_{THz}(t)$ can be shifted to higher frequencies depending on the $\Delta t_d$. For example, when imposing a delayed time $\Delta t_d$=5.5 ps, the peak frequency of 0.668 THz at $\Delta t_d$=0 ps (top panel of FIG. 8D) is shifted to 0.688 THz (middle panel of FIG. 8D), when imposing a delayed time $\Delta t_d$ 6.55 ps, the peak frequency is shifted to 0.748 THz (bottom panel of FIG. 8D). This is because two consecutive laser pulses lead to the injection of two consecutive longitudinal acoustic pulses (see FIG. 8E). The spin waves excited by these two acoustic pulses interact with each other and alter the relative weight of difference frequency modes in the entire spin wave package, leading to the observed changes in the frequency spectra of the emitted THz wave. The simulated shift in the highest peak frequency agrees well with that from an analytical model (FIG. 8C), which assumes the superposition of two phase-shifted sinusoidal waves. The time-domain profile of $E_{THz}(t)$ is shown in FIG. 8F. The overlap between two distinct pulses can clearly be seen.

The second example demonstrates that the type-2 acousto-STE (its architecture is illustrated in FIG. 2) can also generate an ultra-narrowband (bandwidth ~0.01 THz) THz radiation, in a similar fashion to type-1 acousto-STE. The peak frequencies of the emitted wave will likewise be in the lower-end of the THz spectra (0.1-1 THz).

Figures 9A, 9B:
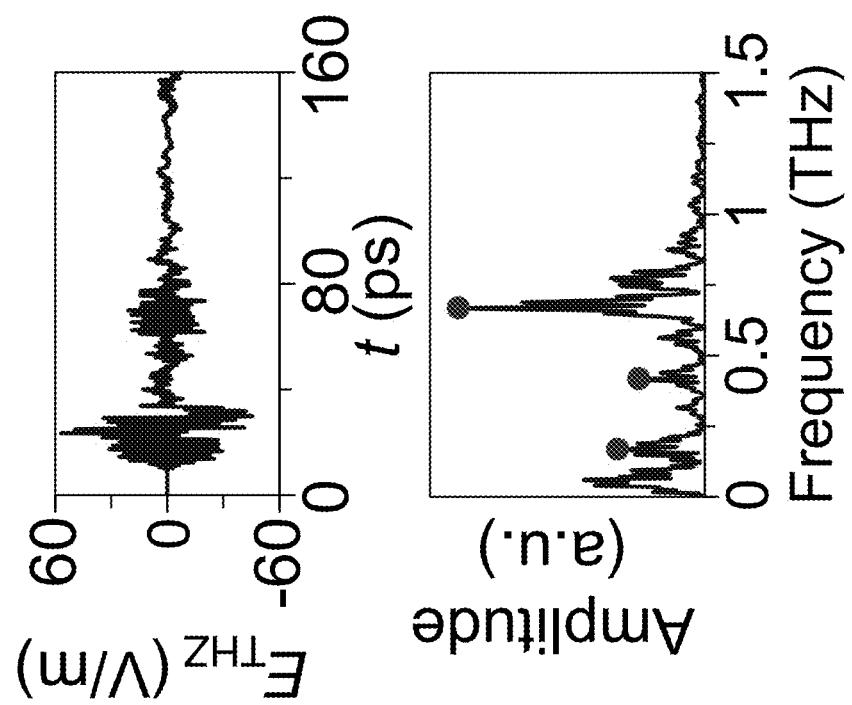
FIG. 9A shows calculated $E_{THz}(t)$ of the acousto-STE shown in FIG. 2 and discussed in the Example.
FIG. 9B shows its Fourier frequency spectra. The three highest peaks are indicated with solid dots.
Figure 9C:
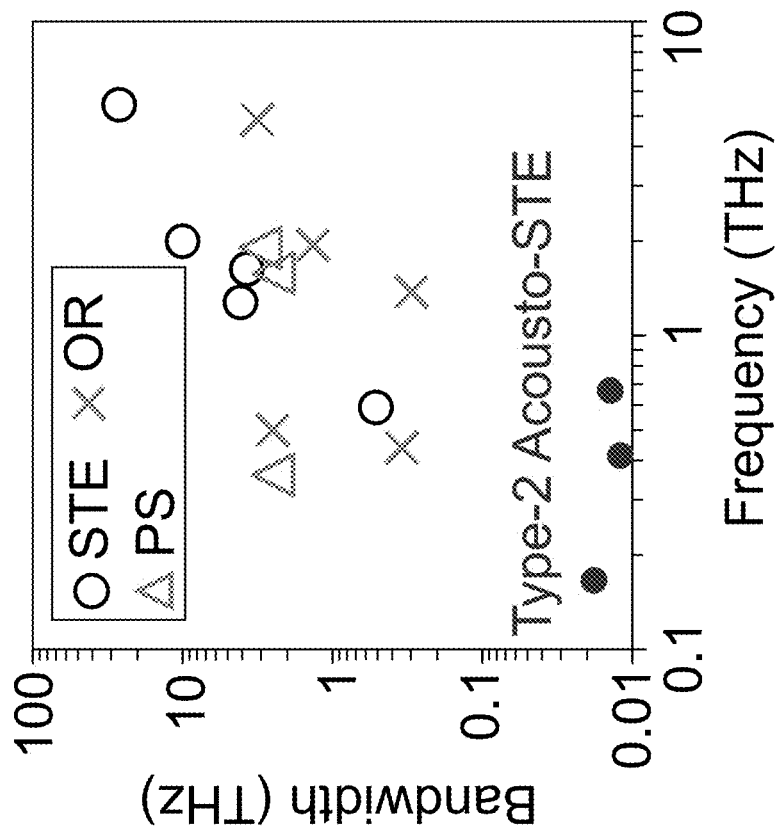
FIG. 9C compares the peak frequencies and bandwidths of the acousto-STE, a conventional STE, and fs-laser-excited THz emitters operating based on photoconductive switch (PS, e.g., GaAs) or optical rectification (OR, e.g., ZnTe).

Using an MgO(substrate)/Fe(20 nm)/MgO(400 nm)/Fe$_{80}$Ga$_{20}$(100 nm)/Pt(15 nm) multilayer stack as an example, FIG. 9A shows the calculated $E_{THz}(t)$ emitted from the Fe$_{80}$Ga$_{20}$/Pt bilayer, and FIG. 9B shows its Fourier frequency spectra. The peak amplitude of the $E_{THz}$ (~60 V/m, FIG. 9A) is at the same scale as previously reported STEs, but its bandwidth (~0.01 THz) is at least one order of magnitude smaller. Note that this bandwidth is also at least one order of magnitude smaller than the fs-laser-excited THz emitters operating based on photoconductive switch or optical rectification, as summarized in FIG. 9C. Such an ultra-narrow bandwidth can enable a significantly improved spectral resolution of existing THz-TDS devices.

Figure 10A:
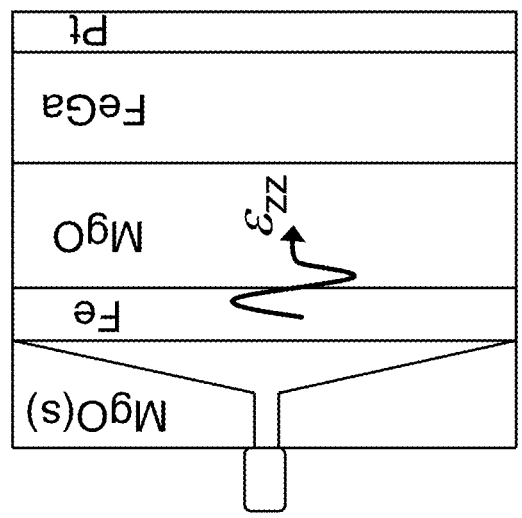
FIG. 10A shows a schematic (side view) of the acousto-STE of FIG. 2, where the incident fs laser pulse passes the transparent MgO substrate and irradiates the entire bottom surface of the Fe film.
Figure 10B:
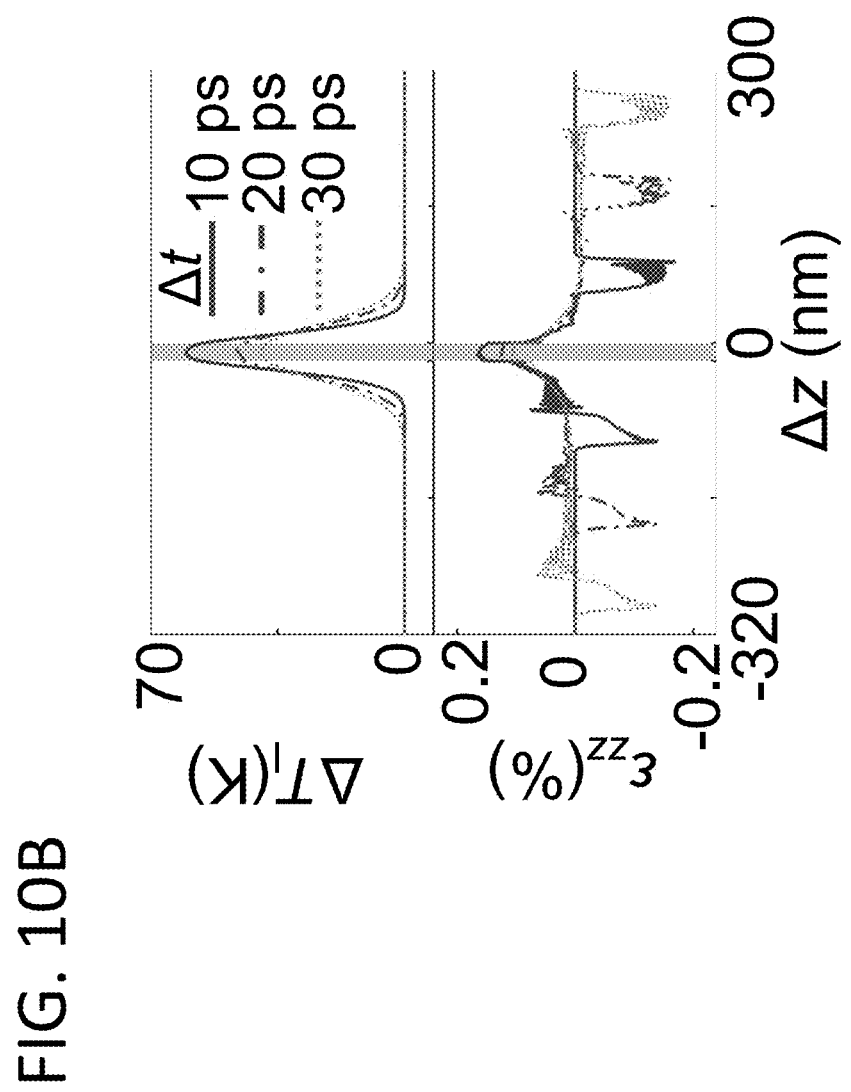
FIG. 10B shows profiles of the lattice temperature rise $\Delta T_1$ (top) and strain $\varepsilon_{zz}$ (bottom) across the thickness direction of MgO(substrate)/Fe(shaded area)/MgO(film) trilayer at $\Delta t$=10 ps, 20 ps, and 30 ps. Here, $\Delta t$=0 ps is defined as the moment when laser pumping starts.
Figure 10C:
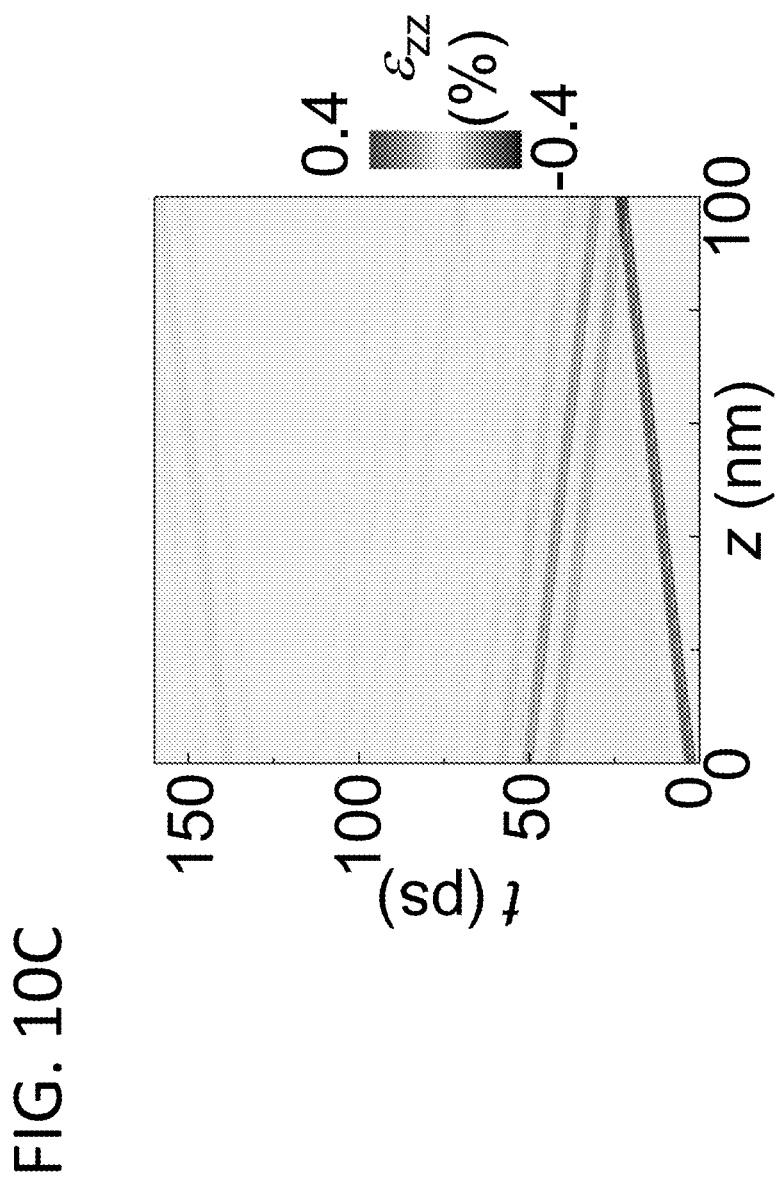
FIGS. 10C and 10D show propagation of the longitudinal acoustic wave (FIG. 10C) and spin wave (FIG. 10D) between the MgO/FeGa and the FeGa/Pt interfaces. Note that the $\varepsilon_{zz}$ and $\Delta m_z$ are evaluated using the mechanical displacement $u_z$ and the normalized perpendicular magnetization $m_z$ at t=0 ps as the reference, respectively, where t=0 ps is defined as the moment when the acoustic wave arrives at the MgO/FeGa interface for the first time.
Figure 10D:
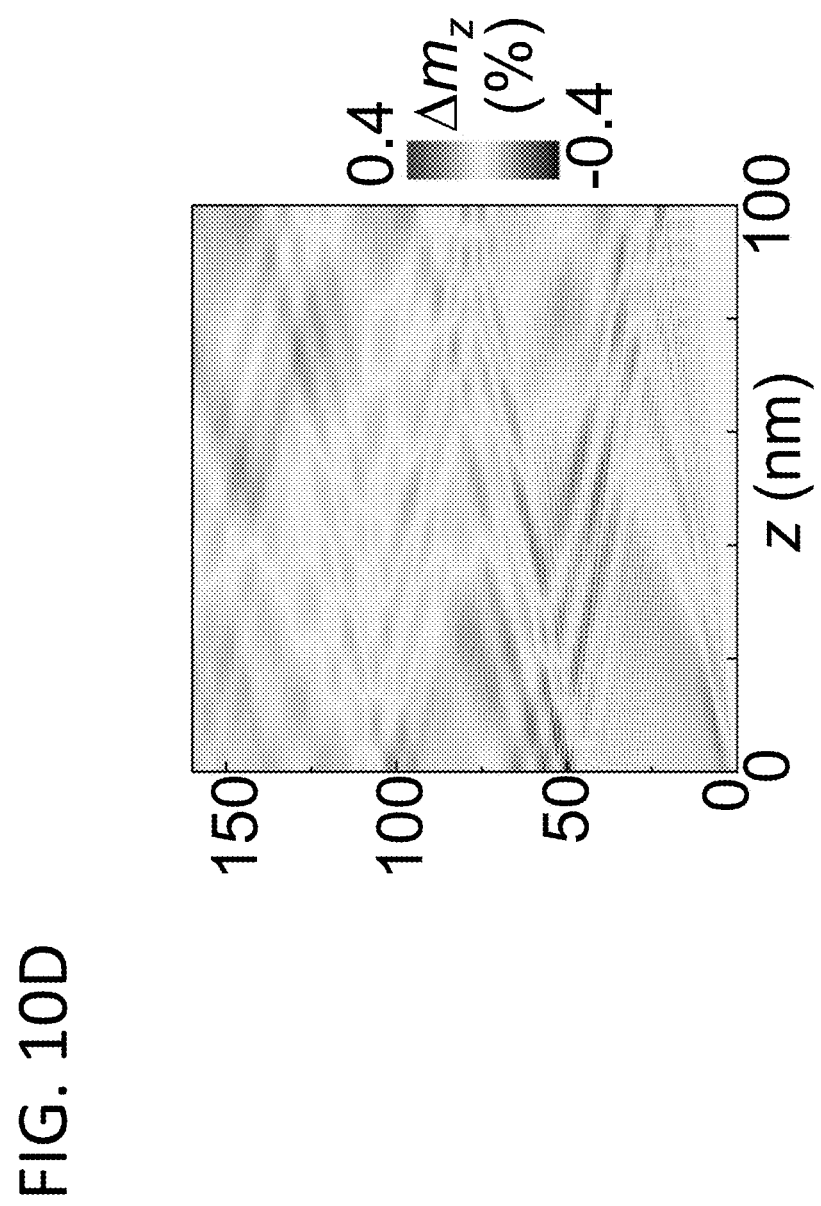
Figure 10E:
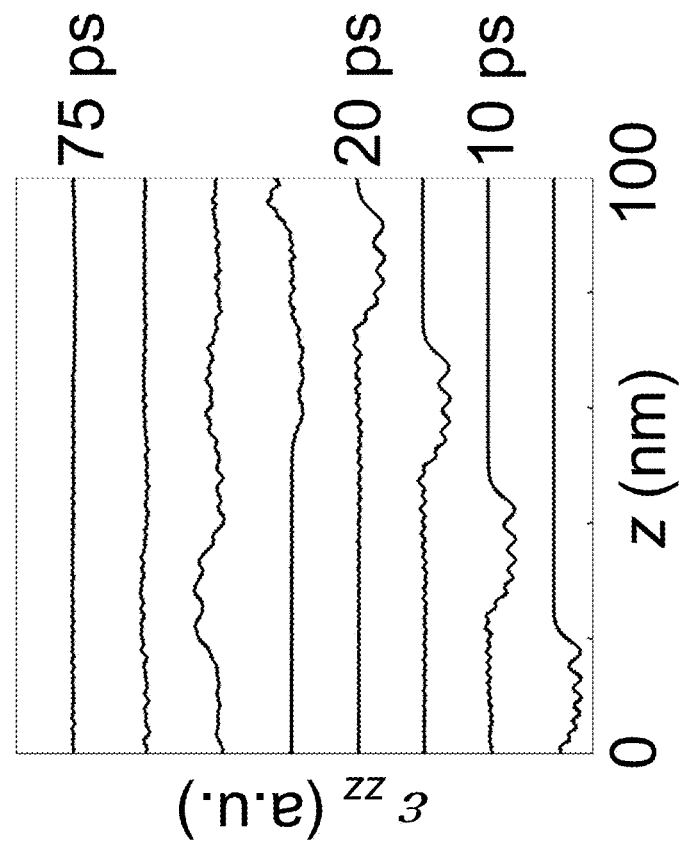
FIGS. 10E and 10F show profiles of an acoustic wave (FIG. 10E) and a spin wave (FIG. 10F) in the FeGa layer, (from bottom to top) at t=5, 10, 15, 20, 30, 45, 60, 75 ps, respectively. The curves are vertically displaced for clarity.
Figure 10F:
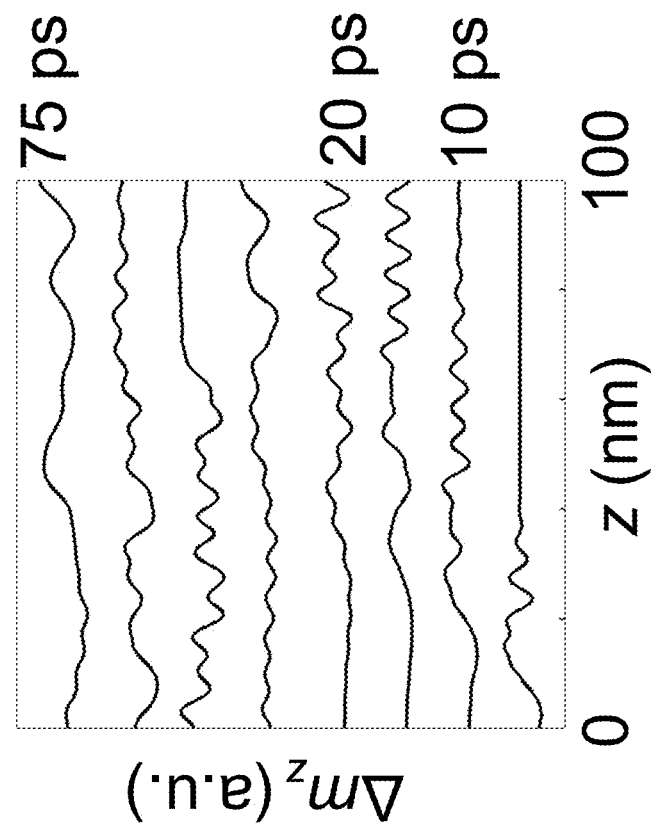

An incident laser beam with a diameter (~5.4 mm) was considered large enough to cover the entire Fe transducer and ensure an almost uniform heating (see schematic in FIG. 10A). The thickness of the Fe (20 nm) was much larger than the absorption length (~17.5 nm) of the Fe to near infrared (wavelength: 800 nm) laser, such that all photons should have been adsorbed by the Fe, thereby increasing the temperature of the electron subsystem. The photoexcited hot electrons then quickly exchanged energy with the lattice subsystem, leading to a rapid rise in the lattice temperature as well. As a result, a longitudinal acoustic wave $\varepsilon_{zz}(t)$ was injected from the Fe into both the underlying MgO substrate and the overlaid MgO film due to the generation of both electronic and lattice thermal stress in Fe. In parallel, heat transport from the hotter Fe to the MgO also began. These coupled processes were described by coupling the classical two-temperature model with the heat transport equation, in which temperature-dependent materials properties (elastic stiffness, heat capacity, heat conductivity, and thermal expansion coefficient) in both the Fe and MgO were considered. FIG. 10B shows the calculated profiles of lattice temperature and longitudinal acoustic wave across the thickness direction of the MgO(substrate)/Fe(shaded area)/MgO (film) trilayer at 10, 20, and 30 ps after the laser pumping. The acoustic wave will then travel across the MgO/Fe$_{80}$Ga$_{20}$ and Fe$_{80}$Ga$_2$O/Pt interfaces and will reach the stress-free top surface of Pt, where it will be reflected back into the Fe$_{80}$Ga$_{20}$ (FeGa hereafter) and then the MgO. Note that a small backward acoustic wave will rise every time the acoustic wave travels across an interface. FIG. 10C shows the propagation of acoustic waves inside the FeGa layer. These acoustic waves will trigger the precession of local magnetization in the FeGa via magnetoelastic coupling, thereby launching a spin wave. Different from the acoustic wave that can travel across interfaces, the spin wave is largely confined in the FeGa and reflected back and forth between the MgO/FeGa and the FeGa/Pt interfaces (see FIG. 10D). Profiles of the acoustic wave and spin wave at several key time stages are plotted in FIGS. 10E and 10F, respectively, which at least indicate two important features. First, the spin wave travels faster than the acoustic wave. Specifically, it takes 20 ps for the acoustic wave to travel from the bottom to the top surface of the FeGa (see FIG. 10E), which is consistent with the speed of sound in the FeGa and its thickness. However, it only takes 10 ps for the spin wave, which was initially excited at the MgO/FeGa interface, to arrive at the FeGa/Pt interface (see FIG. 10F). The high traveling speed of the spin wave primarily results from the short-range exchange coupling among neighboring magnetizations. Second, the acoustic wave, reflected from the FeGa/Pt interface and top surface of Pt, leaves the FeGa and enters the MgO at t=75 ps, leaving a negligibly small backward acoustic wave behind (see FIG. 10E). In contrast, the spin wave remains noticeable at the same time stage (c.f., the 75 ps curve in FIG. 10F). The attenuation of spin waves is mainly attributed to the spin current injection at the FeGa/Pt interface and the damping in the FeGa.

Figure 11A:
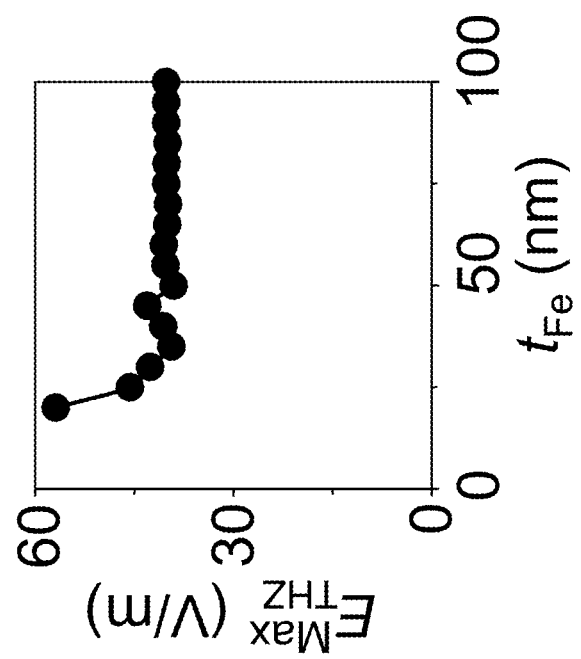
FIG. 11A shows the peak amplitude of the calculated $E_{THz}(t)$ emitted by the acousto-STE of FIG. 2 as a function of the Fe film thickness $t_{Fe}$.
Figure 11B:
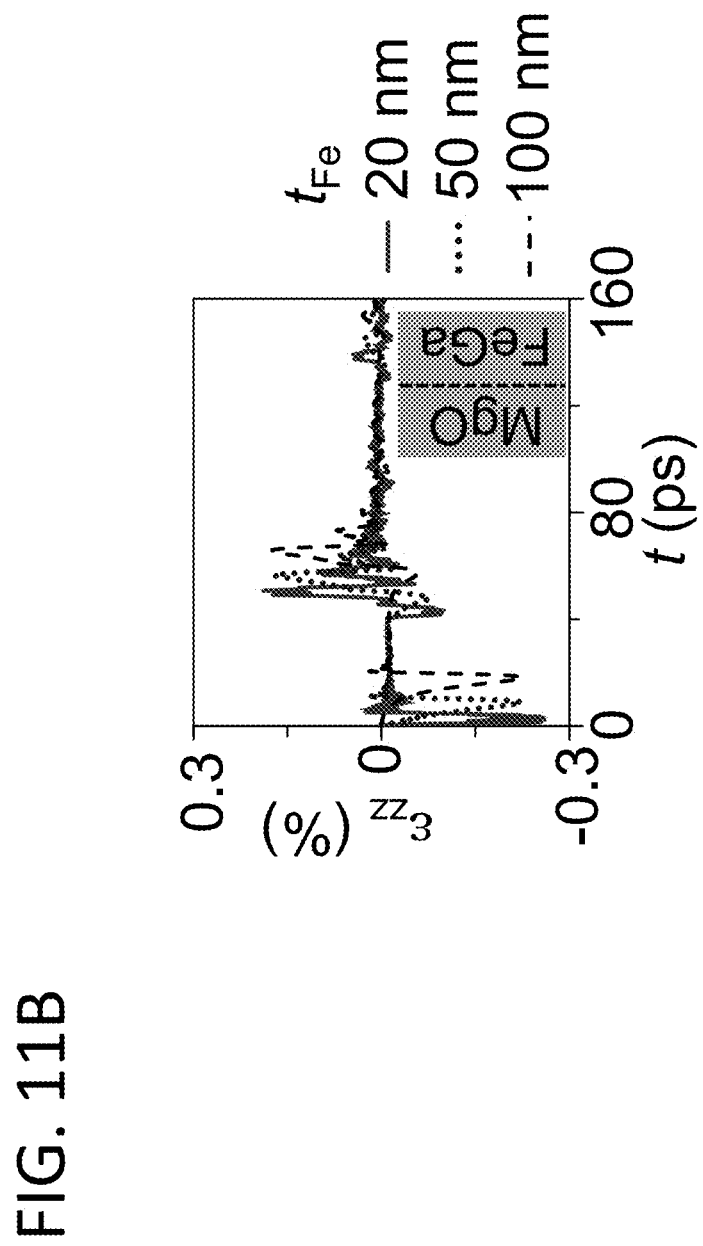
FIG. 11B shows the evolution of local strain at the MgO/FeGa interface (indicated by the dashed line of the inset) for different Fe thicknesses.
Figure 11C:
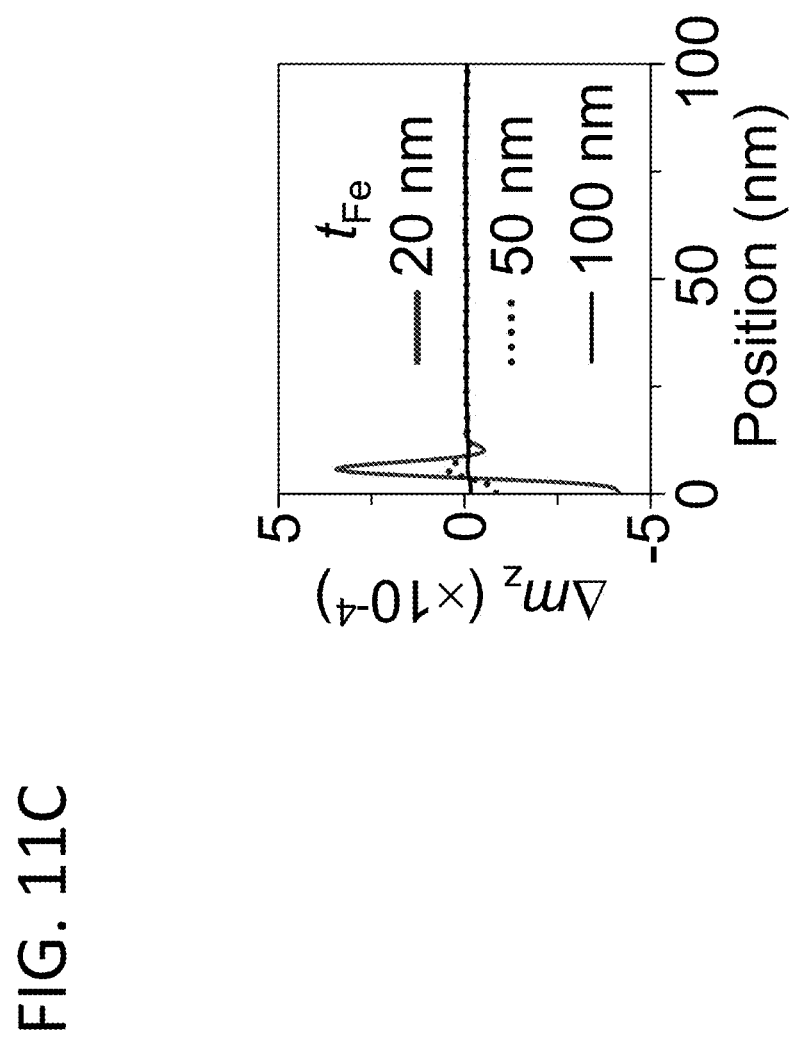
FIG. 11C shows profiles of local magnetization change across the thickness direction of the FeGa.
Figure 11D:
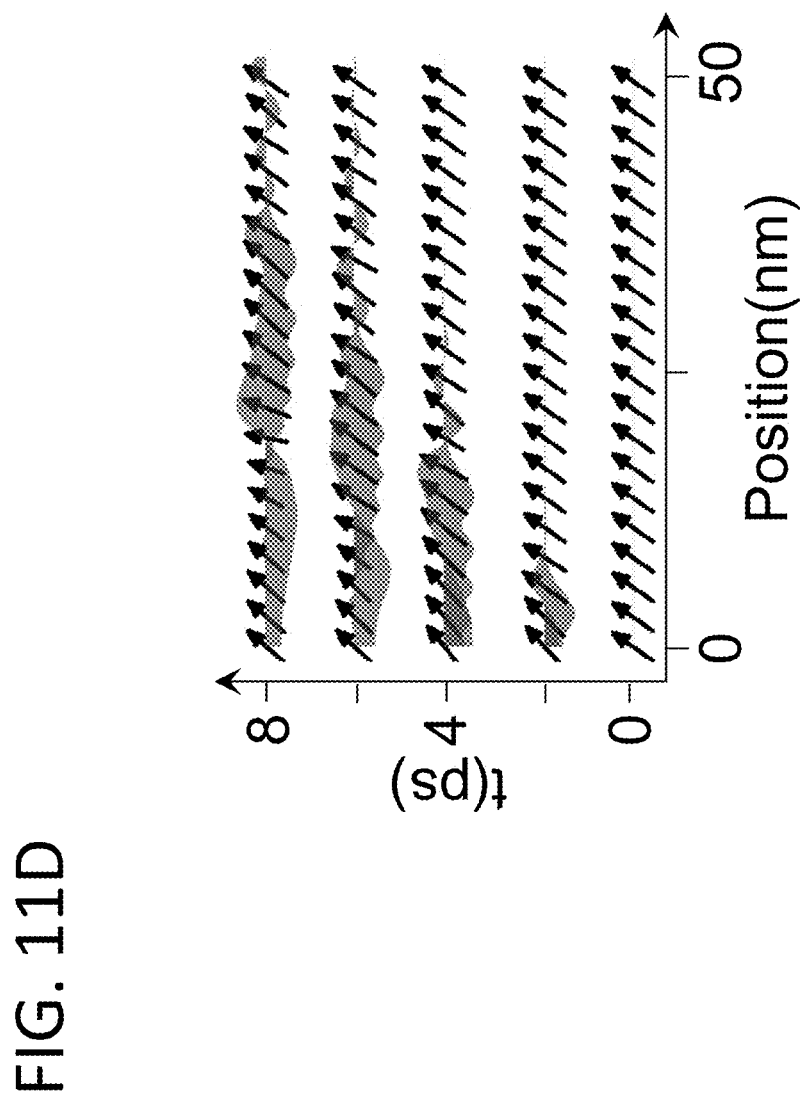
FIG. 11D shows acoustic waves excite the spin waves via the magnetoelastic coupling and the short-range exchange coupling between local magnetization vectors (the arrows).

It is further shown that the thickness of the Fe layer influences the amplitude of the emitted THz pulse. As shown in FIG. 11A, the peak amplitude of the emitted $E_{THz}(t)$ reduces from 57 to 40 V/m when the Fe film thickness increases from 20 nm to 100 nm. This is because a thinner Fe film allows for greater temperature gradient across the Fe/MgO interface, which further leads to faster injection of strain pulse into the FeGa as well as larger magnitude for the strain pulse (FIG. 11B). These in turn induce larger perturbation of the local magnetization at the FeGa bottom surface via the magnetoelastic coupling (FIG. 11C), which then launches a larger-amplitude, sub-THz spin wave via the short-range exchange coupling (FIG. 11D).

Figure 12A:
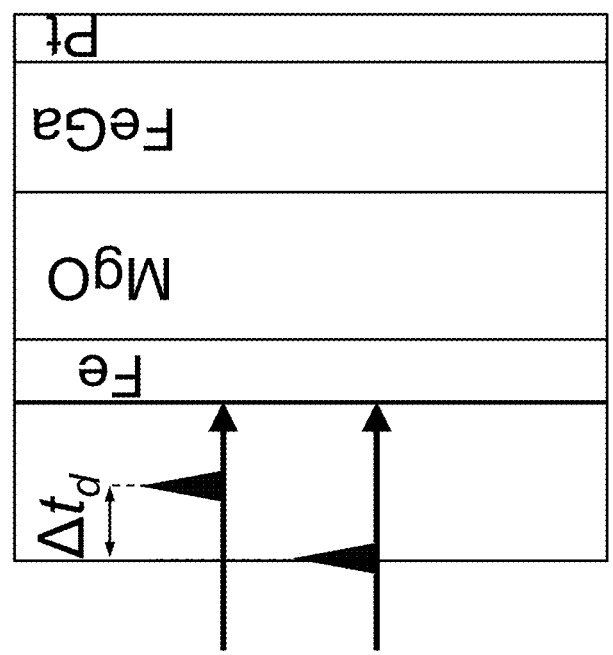
FIG. 12A shows a schematic (side view) of the acousto-STE of FIG. 2, where two identical femtosecond laser pulses are shined on the Fe transducer. One of the two pulses is delayed by a time duration $\Delta t_d$.
Figure 12B:
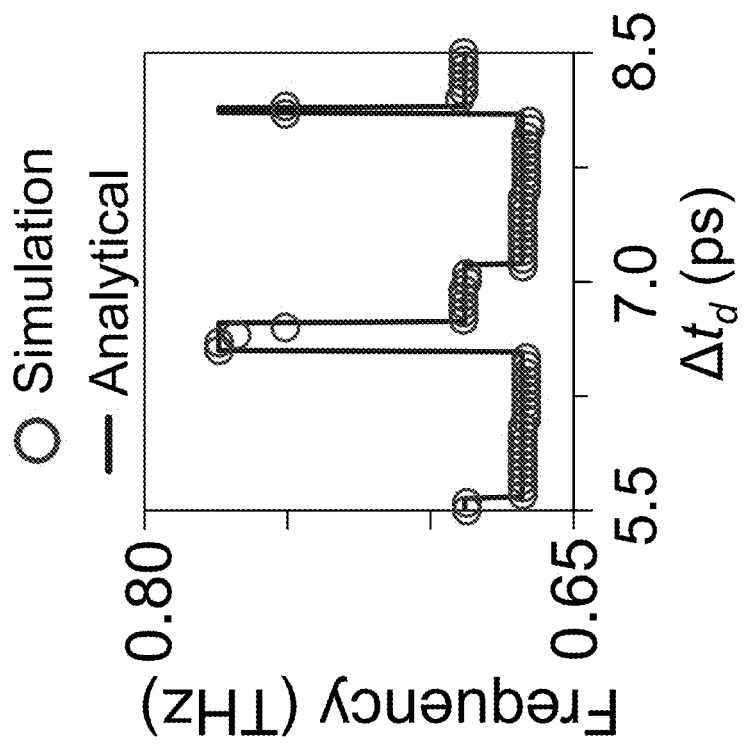
FIG. 12B shows highest peak frequency of the emitted THz pulse as $\Delta t_d$ increases from 0 ps to 15 ps with a 1-ps interval.
Figure 12C:
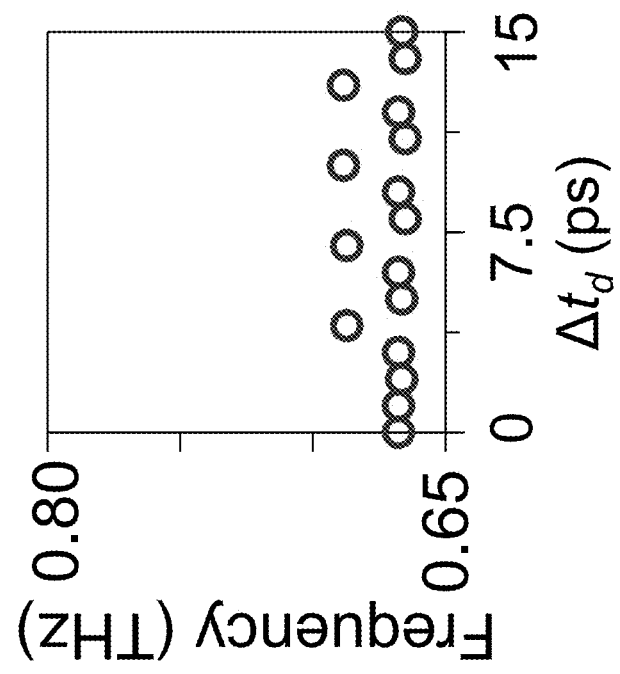
FIG. 12C shows the simulation results with an interval of 0.05 ps for 5.5 ps≤$\Delta t_d$≤8.5 ps. The simulation results can be interpreted using an analytical model.
Figure 12D:
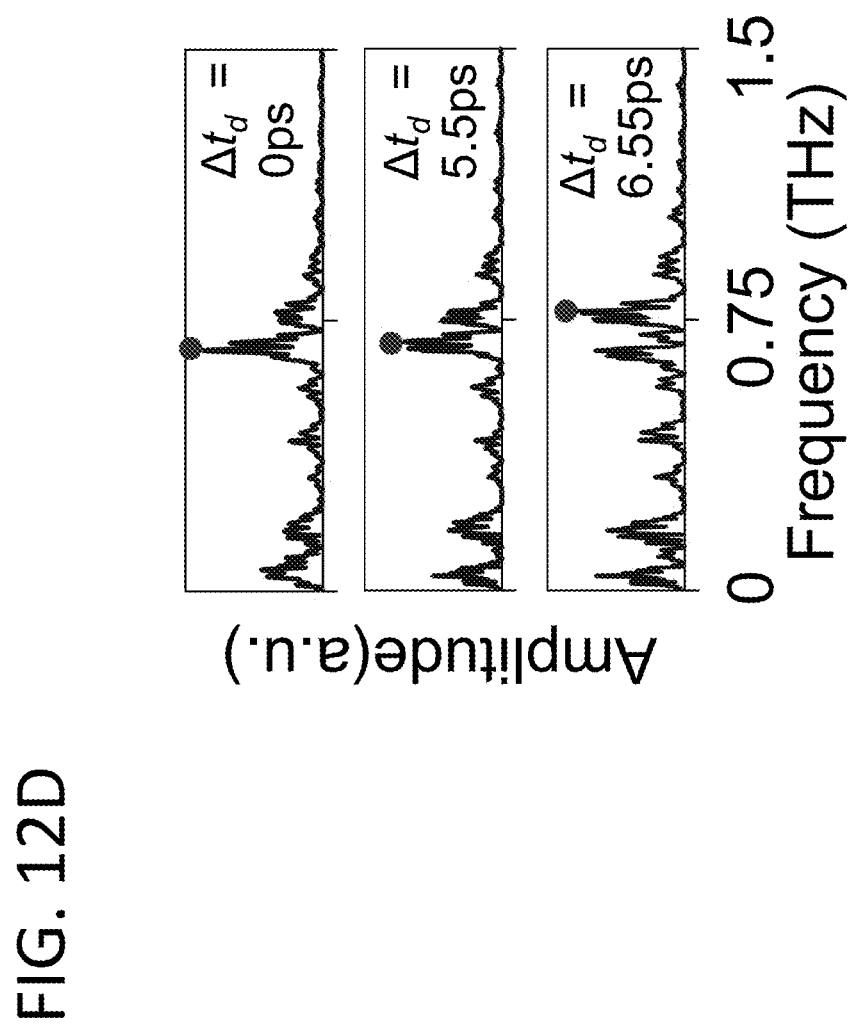
FIG. 12D shows Fourier frequency spectra of the emitted THz pulse when $\Delta t_d$=0 ps (top panel of FIG. 12D), $\Delta t_d$=5.5 ps (middle panel of FIG. 12D), and $\Delta t_d$=6.55 ps (bottom panel of FIG. 12D). The locations of the highest peaks in FIG. 12D are indicated by solid dots.
Figure 12E:
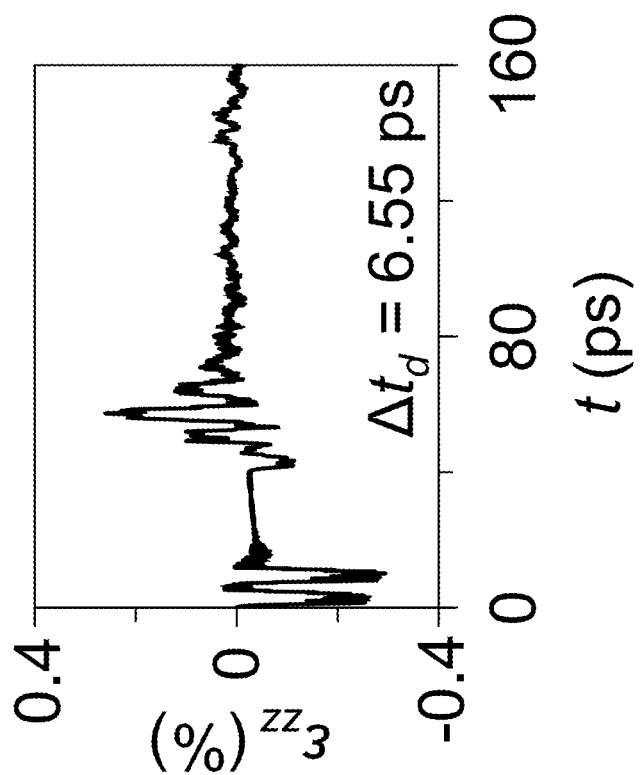
FIGS. 12E and 12F show (FIG. 12E) temporal evolution of the local strain $\varepsilon_{zz}$ at the MgO/FeGa interface and (FIG. 12F) the emitted THz electric field $E_{THz}$ when $\Delta t_d$=6.55 ps.
Figure 12F:
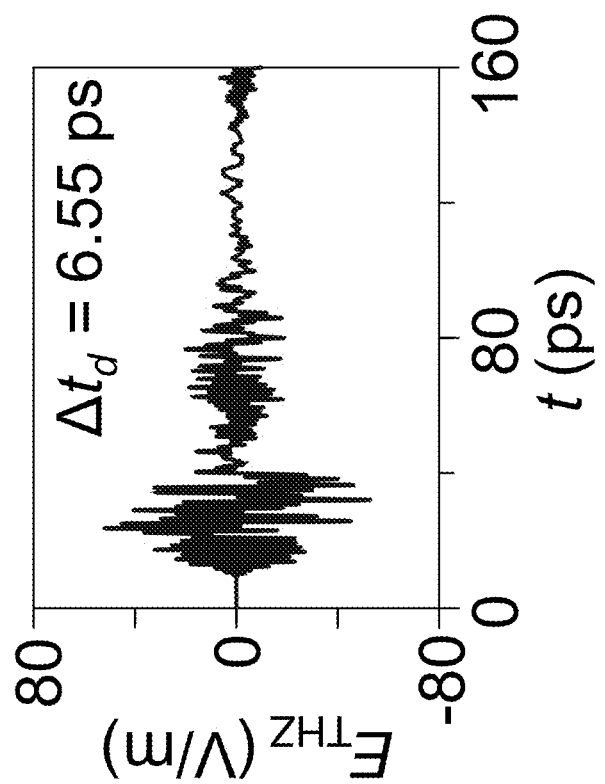

It is further shown that applying two (or more) consecutive fs laser pulses can shift the peak frequency of the emitted THz pulse. Consider two identical laser pulses, one of which was delayed by a time duration $\Delta t_d$ (FIG. 12A). As shown in FIGS. 12B and 12C, the peak frequency of the emitted $E_{THz}(t)$ can be shifted to higher frequencies depending on the $\Delta t_d$. For example, when imposing a delayed time $\Delta t_d$=5.5 ps, the peak frequency of 0.668 THz at $\Delta t_d$=0 ps (top panel of FIG. 12D) is shifted to 0.688 THz (middle panel of FIG. 12D); when imposing a delayed time $\Delta t_d$ 6.55 ps, the peak frequency is shifted to 0.774 THz (bottom panel of FIG. 12D). This is because two consecutive laser pulses lead to the injection of two consecutive longitudinal acoustic pulses (see FIG. 12E). The spin waves excited by these two acoustic pulses interact with each other and alter the relative weight of difference frequency modes in the entire spin wave package, leading to the observed changes in the frequency spectra of the emitted THz wave. The simulated shift in the highest peak frequency agrees well with that from an analytical model (FIG. 12C), which assumes the superposition of two phase-shifted sinusoidal waves. The time-domain profile of $E_{THz}(t)$ is shown in FIG. 12F. The overlap between two distinct pulses can clearly be seen.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A heterostructure comprising:
a transducer layer having a first surface and consisting of a metal selected from the group consisting of aluminum, iron, platinum, gold, cobalt, and nickel;
a thermal insulation layer adjacent to a second surface of the transducer layer opposite the first surface;
a magnetic layer comprising a ferromagnetic or ferrimagnetic material in contact with a surface of the thermal insulation layer opposite the transducer layer, such that the thermal insulation layer is disposed between the transducer layer and the magnetic layer; and
a heavy metal layer comprising a heavy metal adjacent to a surface of the magnetic layer opposite the thermal insulation layer, such that the magnetic layer is disposed between the thermal insulation layer and the heavy metal layer.

2. The heterostructure of claim 1, wherein the thermal insulation layer is a layer of magnesium oxide, the magnetic layer is a layer of FeGa, and the heavy metal layer is a layer of platinum.

3. A heterostructure comprising:
a transducer layer having a first surface and consisting of a metal selected from the group consisting of aluminum, iron, platinum, gold, cobalt, and nickel;
a thermal insulation layer adjacent to a second surface of the transducer layer opposite the first surface;
a magnetic layer comprising a ferromagnetic or ferrimagnetic material adjacent to a surface of the thermal insulation layer opposite the transducer layer, such that the thermal insulation layer is disposed between the transducer layer and the magnetic layer; and
a heavy metal layer comprising a heavy metal adjacent to a surface of the magnetic layer opposite the thermal insulation layer, such that the magnetic layer is disposed between the thermal insulation layer and the heavy metal layer, wherein the thermal insulation layer has a thickness in the range from 400 nm to 500 µm, the transducer layer has a thickness in the range from 10 nm to 25 nm, and the magnetic layer has a thickness of at least 50 nm.

4. The heterostructure of claim 3, wherein the thermal insulation layer is a single-crystalline layer and the magnetic layer is a single-crystalline layer.

5. The heterostructure of claim 4, wherein the thermal insulation layer is a layer of magnesium oxide, the transducer layer is a layer of aluminum or a layer of iron, the magnetic material is FeGa, and the heavy metal is platinum.

6. The heterostructure of claim 3, wherein the magnetic layer is a polycrystalline layer or an amorphous layer.

7. The heterostructure of claim 6, wherein the thermal insulation layer is a layer of magnesium oxide, the transducer layer is a layer of aluminum or a layer of iron, the magnetic material is FeGa, and the heavy metal is platinum.

8. A terahertz radiation source comprising:
(a) a heterostructure comprising:
(i) a transducer layer having a light receiving surface and consisting of a metal selected from the group consisting of aluminum, iron, platinum, gold, cobalt, and nickel;
(ii) a thermal insulation layer adjacent to a surface of the transducer layer opposite the light receiving surface;
(iii) a magnetic layer comprising a ferromagnetic or ferrimagnetic material in contact with a surface of the thermal insulation layer opposite the transducer layer, such that the thermal insulation layer is disposed between the transducer layer and the magnetic layer; and
(iv) a heavy metal layer comprising a heavy metal adjacent to a surface of the magnetic layer opposite the thermal insulation layer, such that the magnetic layer is disposed between the thermal insulation layer and the heavy metal layer; and
(b) a femtosecond pulse laser positioned to direct femtosecond laser pulses onto the light receiving surface of the transducer layer.

9. The terahertz radiation source of claim 8, wherein the thermal insulation layer is a layer of magnesium oxide, the magnetic layer is a layer of FeGa, and the heavy metal layer is a layer of platinum.

10. A method of generating THz radiation using a terahertz radiation source comprising:
(a) a heterostructure comprising:
(i) a transducer layer having a light receiving surface and consisting of a metal selected from the group consisting of aluminum, iron, platinum, gold, cobalt, and nickel;
(ii) a thermal insulation layer adjacent to a surface of the transducer layer opposite the light receiving surface;
(iii) a magnetic layer comprising a ferromagnetic or ferrimagnetic material adjacent to a surface of the thermal insulation layer opposite the transducer layer, such that the thermal insulation layer is disposed between the transducer layer and the magnetic layer; and
(iv) a heavy metal layer comprising a heavy metal adjacent to a surface of the magnetic layer opposite the thermal insulation layer, such that the magnetic layer is disposed between the thermal insulation layer and the heavy metal layer; and
(b) a femtosecond pulse laser positioned to direct femtosecond laser pulses onto the light receiving surface of the transducer layer, the method comprising:
irradiating the light receiving surface of the transducer layer with femtosecond laser pulses from the femtosecond pulse laser to generate acoustic pulses that traverse the thermal insulation layer and are injected into the magnetic layer to generate a spin current in the magnetic layer, wherein the spin current is converted into a charge current in the heavy metal layer that gives rise to THz radiation emission from the heavy metal layer.

11. The method of claim 10, wherein the thermal insulation layer has a thickness in the range from 400 nm to 500

μm, the transducer layer has a thickness in the range from 10 nm to 25 nm, and the magnetic layer has a thickness of at least 50 nm.

12. The method of claim 10, wherein the thermal insulation layer is a layer of magnesium oxide, the magnetic layer is a layer of FeGa, and the heavy metal layer is a layer of platinum.

13. A terahertz time-domain spectrometer comprising:
a femtosecond pulse laser that emits a pulsed femtosecond laser beam;
a beam splitter in a path of the pulse femtosecond laser beam, wherein the beam splitter splits the pulsed femtosecond laser beam into a pump beam and a probe beam;
the heterostructure comprising:
a transducer layer having a light receiving surface and consisting of a metal selected from the group consisting of aluminum, iron, platinum, gold, cobalt, and nickel;
a thermal insulation layer adjacent to a surface of the transducer layer opposite the light receiving surface;
a magnetic layer comprising a ferromagnetic or ferrimagnetic material in contact with a surface of the thermal insulation layer opposite the transducer layer, such that the thermal insulation layer is disposed between the transducer layer and the magnetic layer; and
a heavy metal layer comprising a heavy metal adjacent to a surface of the magnetic layer opposite the thermal insulation layer, such that the magnetic layer is disposed between the thermal insulation layer and the heavy metal layer, wherein the heterostructure is configured in a path of the pump beam such that the pump beam irradiates the transducer layer;
a terahertz detector, configured to detect a terahertz pulse output signal emitted from the heterostructure; and
a delay line assembly configured in the path of the probe beam to create an adjustable time delay in the probe beam and to direct the probe beam onto the terahertz detector.

14. The terahertz time-domain spectrometer of claim 13, wherein the thermal insulation layer has a thickness in the range from 400 nm to 500 μm, the transducer layer has a thickness in the range from 10 nm to 25 nm, and the magnetic layer has a thickness of at least 50 nm.

15. The terahertz time-domain spectrometer of claim 13, wherein the thermal insulation layer is a layer of magnesium oxide, the magnetic layer is a layer of FeGa, and the heavy metal layer is a layer of platinum.

16. A terahertz radiation source comprising:
(a) a heterostructure comprising:
(i) a transducer layer having a light receiving surface and consisting of a metal selected from the group consisting of aluminum, iron, platinum, gold, cobalt, and nickel;
(ii) a thermal insulation layer adjacent to a surface of the transducer layer opposite the light receiving surface;
(iii) a magnetic layer comprising a ferromagnetic or ferrimagnetic material adjacent to a surface of the thermal insulation layer opposite the transducer layer, such that the thermal insulation layer is disposed between the transducer layer and the magnetic layer; and
(iv) a heavy metal layer comprising a heavy metal adjacent to a surface of the magnetic layer opposite the thermal insulation layer, such that the magnetic layer is disposed between the thermal insulation layer and the heavy metal layer; and
(b) a femtosecond pulse laser positioned to direct femtosecond laser pulses onto the light receiving surface of the transducer layer, wherein the thermal insulation layer has a thickness in the range from 400 nm to 500 μm, the transducer layer has a thickness in the range from 10 nm to 25 nm, and the magnetic layer has a thickness of at least 50 nm.

* * * * *